(12) United States Patent
Shimosato et al.

(10) Patent No.: US 8,024,580 B2
(45) Date of Patent: Sep. 20, 2011

(54) TRANSMITTING APPARATUS, RECEIVING APPARATUS, AND DATA TRANSMITTING SYSTEM

(75) Inventors: Tsutomu Shimosato, Tokyo (JP); Yujiro Ito, Kanagawa (JP); Kazunobu Tsujikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 12/481,658

(22) Filed: Jun. 10, 2009

(65) Prior Publication Data

US 2009/0245509 A1    Oct. 1, 2009

Related U.S. Application Data

(62) Division of application No. 10/572,162, filed as application No. PCT/JP2004/013979 on Sep. 16, 2004, now Pat. No. 7,885,407.

(30) Foreign Application Priority Data

Sep. 19, 2003  (JP) ................................. 2003-327519

(51) Int. Cl.
    *H04N 7/167*  (2011.01)
(52) U.S. Cl. ........................... 713/189; 380/28; 380/268
(58) Field of Classification Search .................... 380/28, 380/201, 268; 713/189; 726/30, 1
    See application file for complete search history.

(56) References Cited

U.S. PATENT DOCUMENTS

| 6,715,076 | B1 | 3/2004 | Challapali |
| 2003/0123699 | A1* | 7/2003 | Wakao et al. ................. 382/100 |
| 2004/0018001 | A1* | 1/2004 | Reitmeier et al. .............. 386/94 |
| 2004/0039927 | A1* | 2/2004 | Hazama et al. ................ 713/189 |
| 2005/0008156 | A1 | 1/2005 | Pelly |
| 2006/0195886 | A1 | 8/2006 | Ashley |

FOREIGN PATENT DOCUMENTS

| EP | 1283510 A1 * | 2/2003 |
| JP | 3 239032 | 10/1991 |
| JP | 2000 56681 | 2/2000 |
| JP | 2002 281475 | 9/2002 |
| JP | 2003 51816 | 2/2003 |
| JP | 2003 512784 | 4/2003 |
| JP | 2003 134482 | 5/2003 |

(Continued)

*Primary Examiner* — Hosuk Song
*Assistant Examiner* — Baotran N To
(74) *Attorney, Agent, or Firm* — Frommer Lawrence & Haug LLP; William S. Frommer; Paul A. Levy

(57) ABSTRACT

Video data exploitation by alteration of data is prevented. An extractor 111 extracts valid video data in data 110 and predetermined data in the data. An inserter 114 inserts an arithmetic operation result of the predetermined data by an arithmetic operation unit 113 into the valid video data encrypted by an encryptor 112. An output of the inserter 114 is supplied to an extractor 144 through a transmission path 120. The encrypted valid video data and arithmetic operation resultant data of the arithmetic operation unit 113 are extracted. An arithmetic operation unit 143 executes the same arithmetic operation as that of the arithmetic operation unit 113 to data corresponding to the data used in the arithmetic operation unit 113 from the valid video data decrypted by a decryptor 141 and extracted by an extractor 144. A comparator 145 compares an output of the arithmetic operation unit 143 with an arithmetic operation result extracted from data 140. When both of them do not coincide, it is determined that there is a possibility that the transmission data has been altered. An output of an another-output generator 146 is outputted as output data 148.

19 Claims, 29 Drawing Sheets

FOREIGN PATENT DOCUMENTS

| | | |
|---|---|---|
| JP | 2003 198540 | 7/2003 |
| JP | 2003 526967 | 9/2003 |
| JP | 2005 512139 | 4/2005 |
| JP | 2007 500464 | 1/2007 |
| WO | WO 02 37285 | 11/2001 |
| WO | WO 01 82267 | 5/2002 |
| WO | WO 03 049440 | 6/2003 |

* cited by examiner

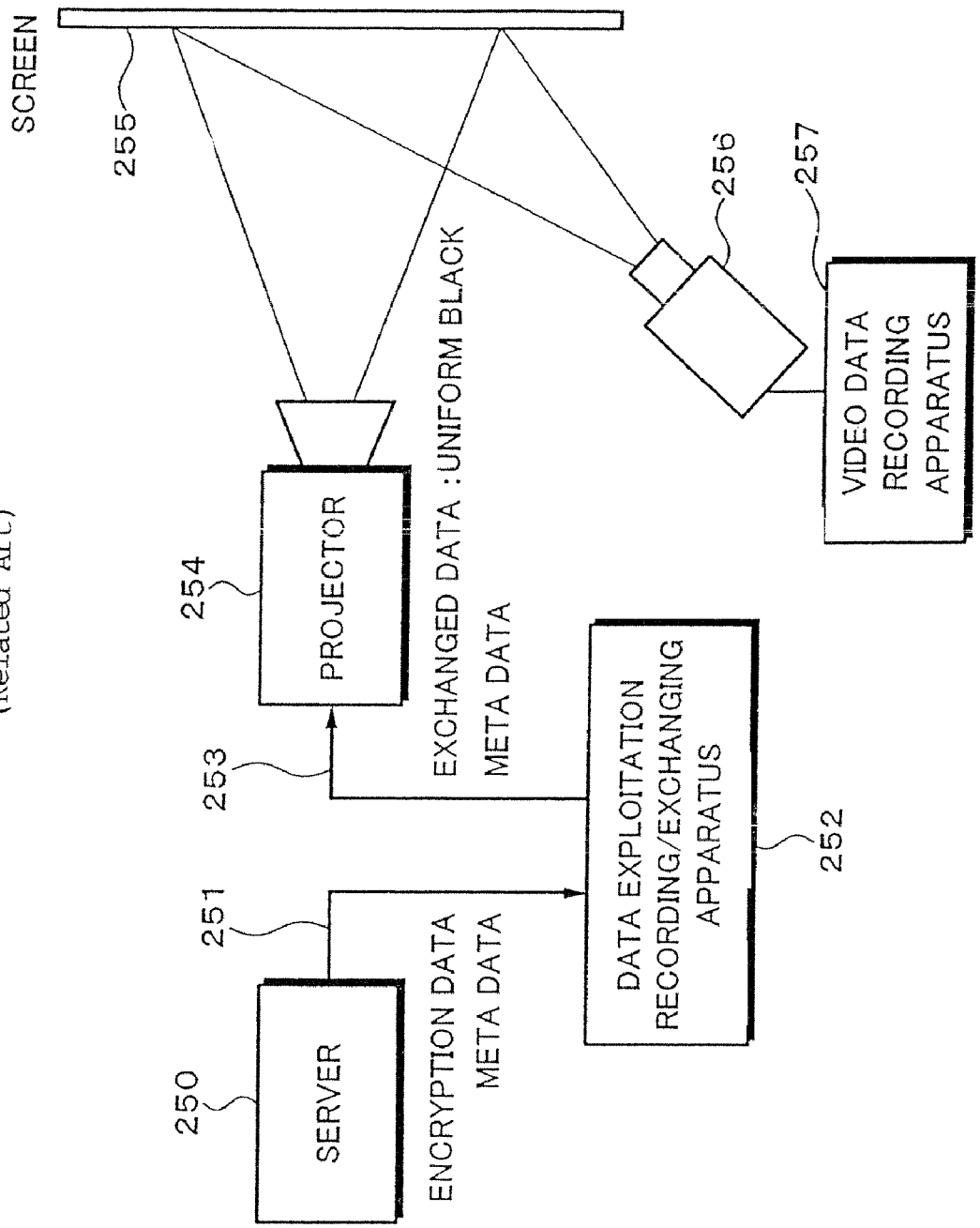

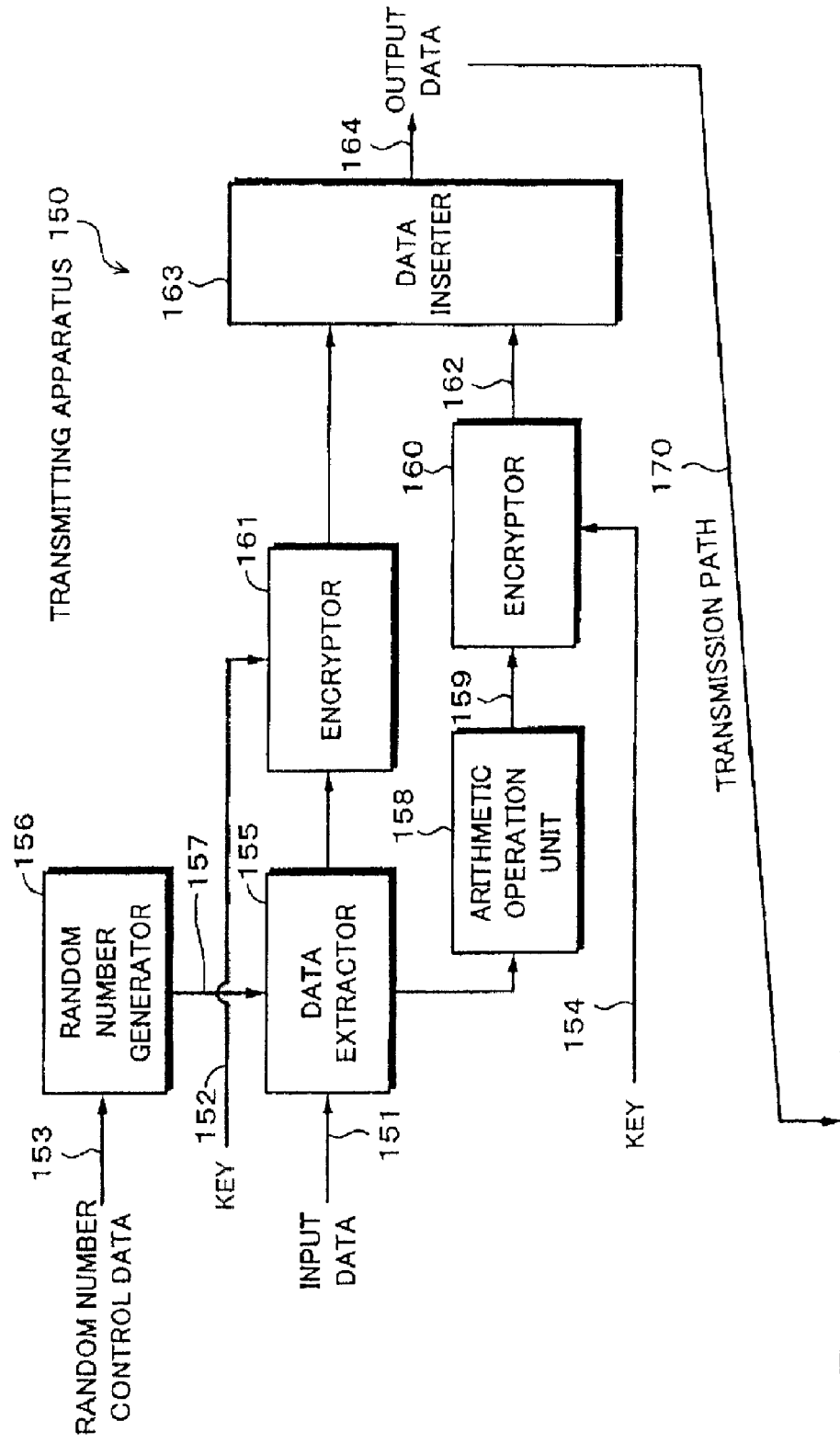

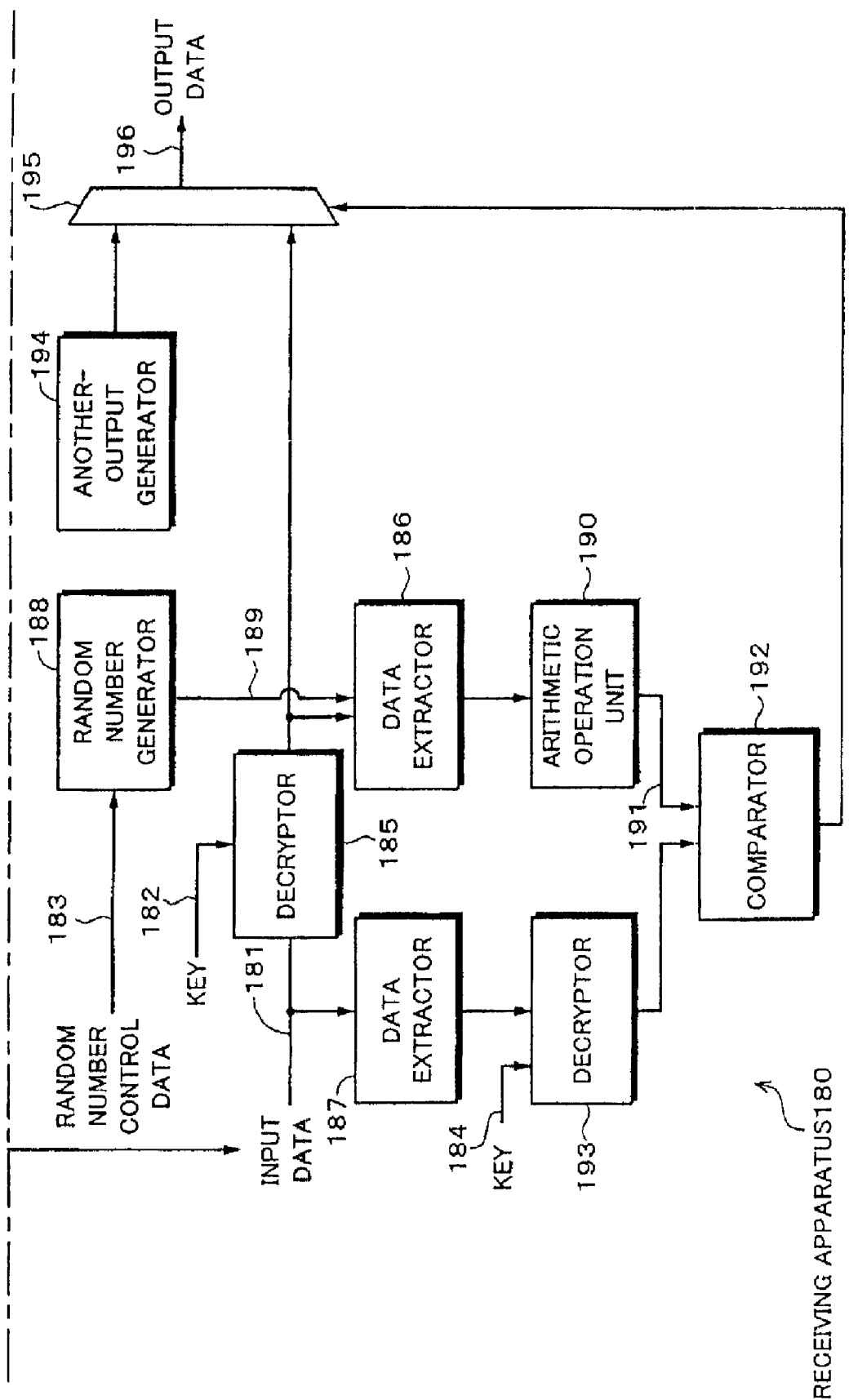

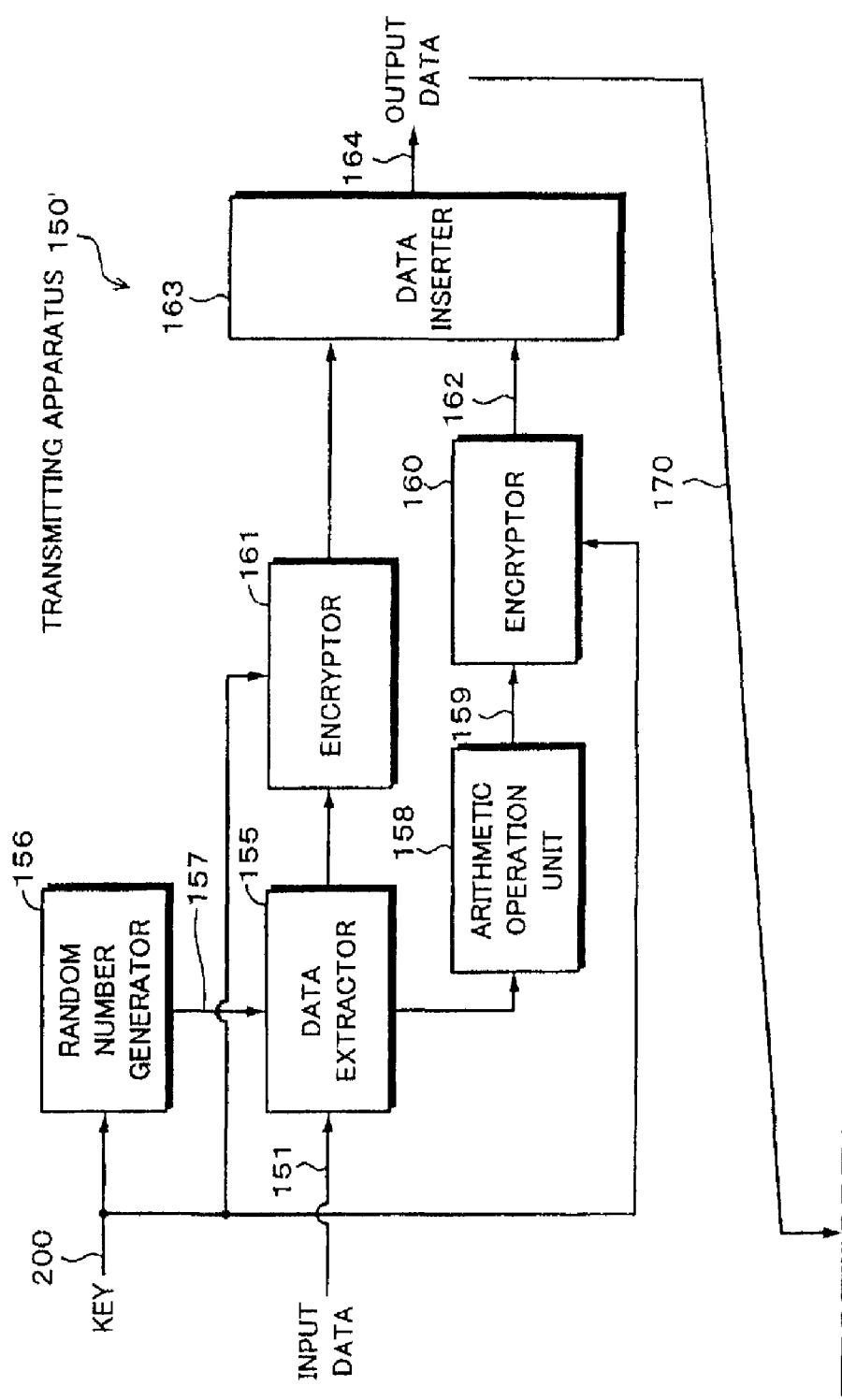

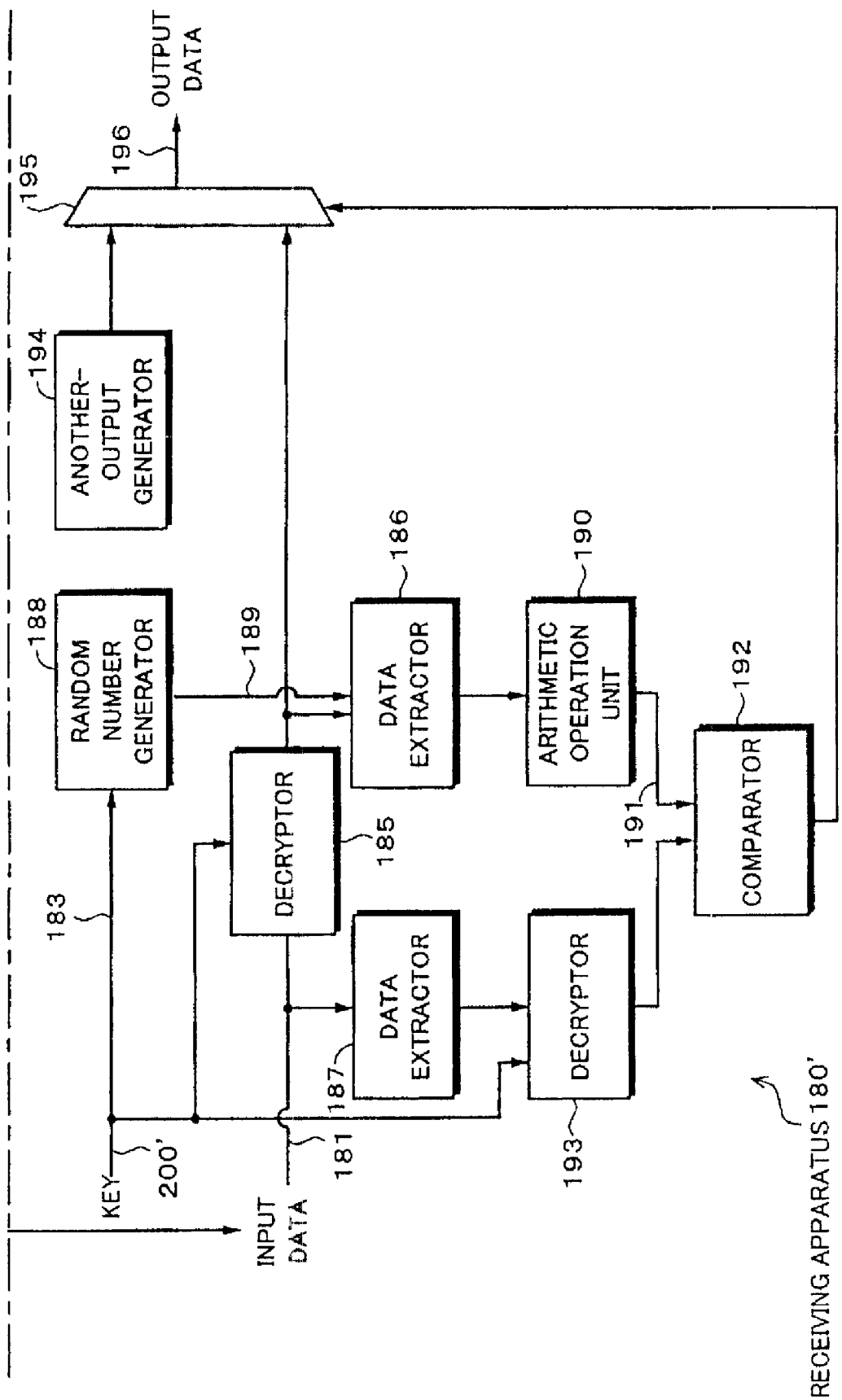

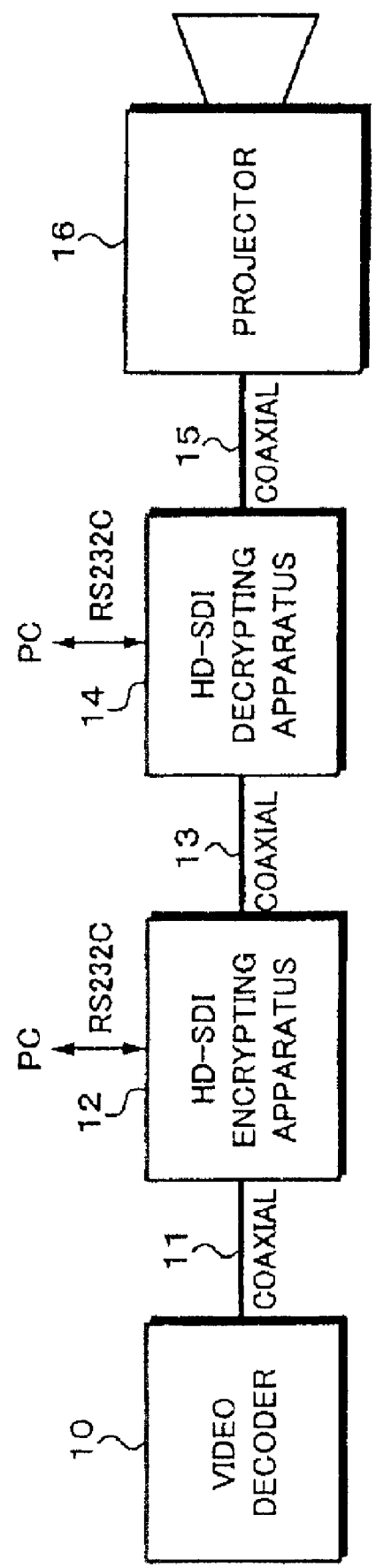

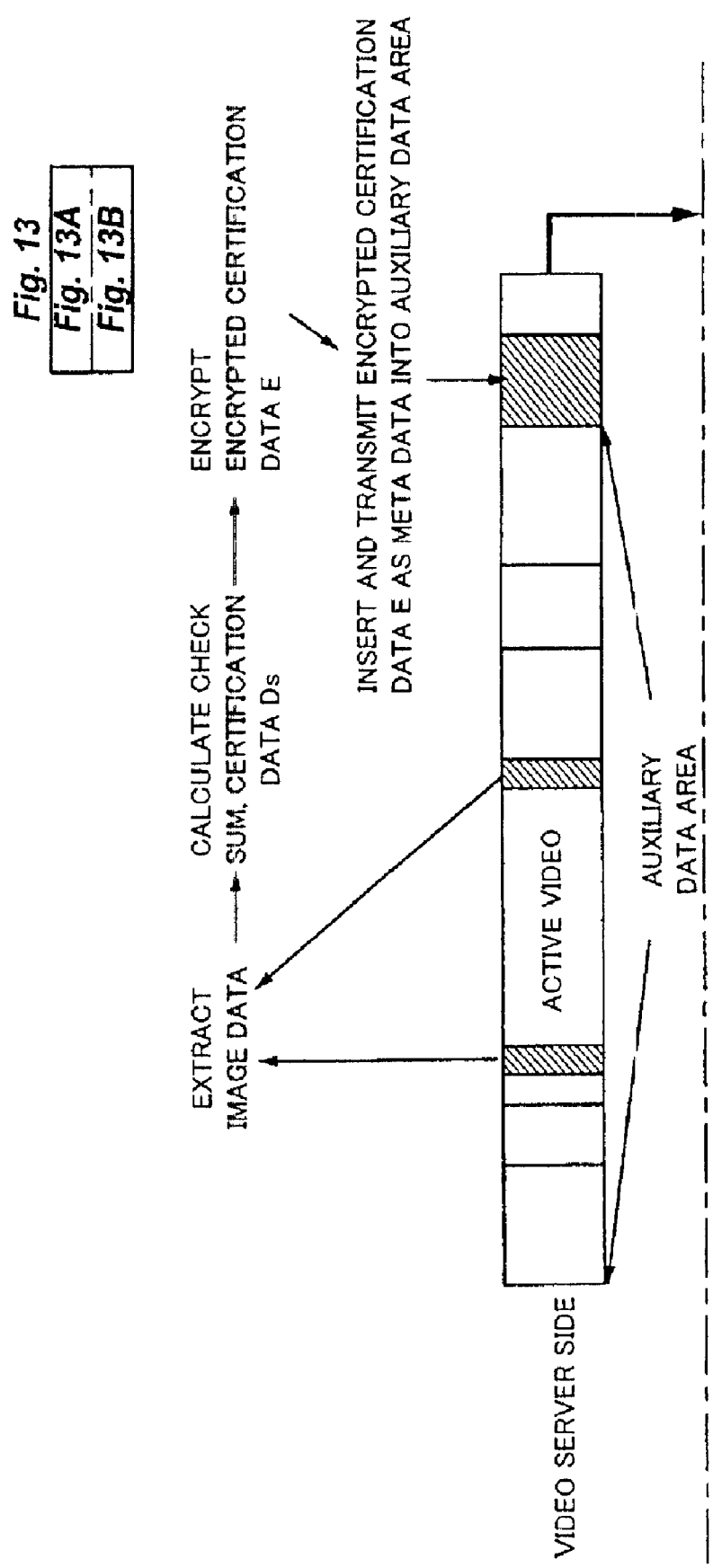

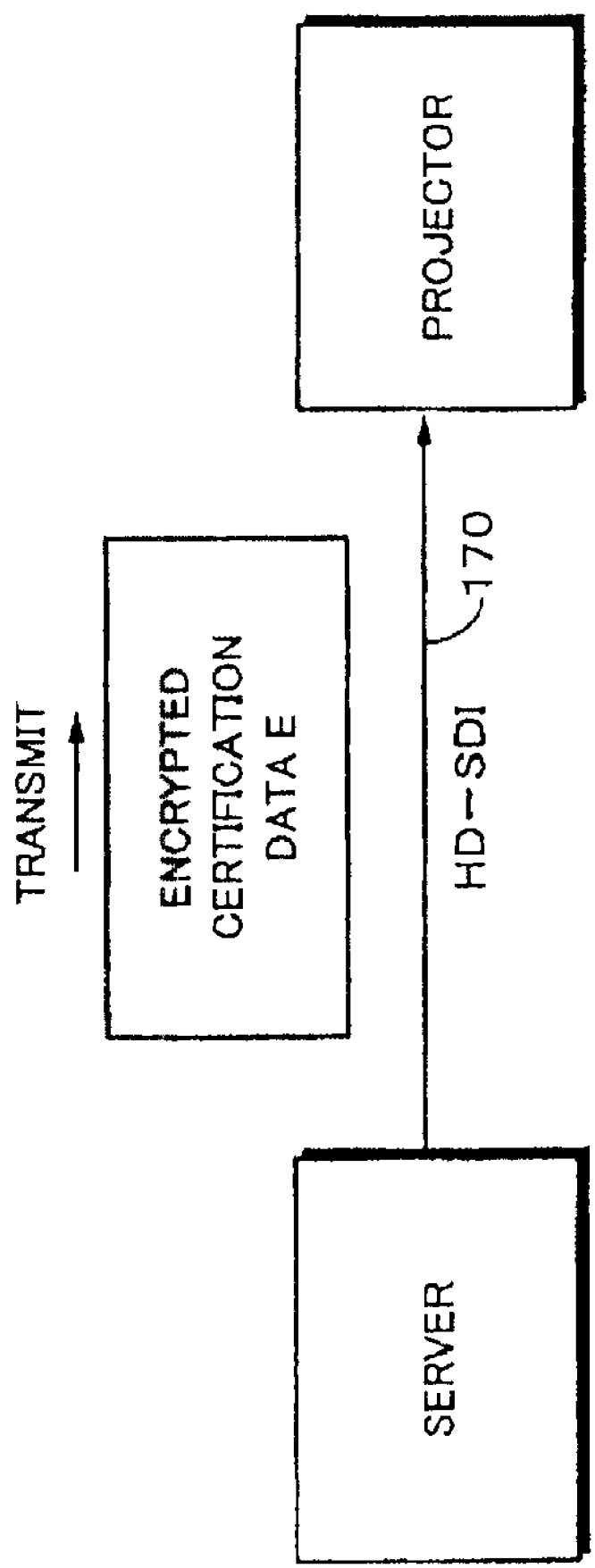

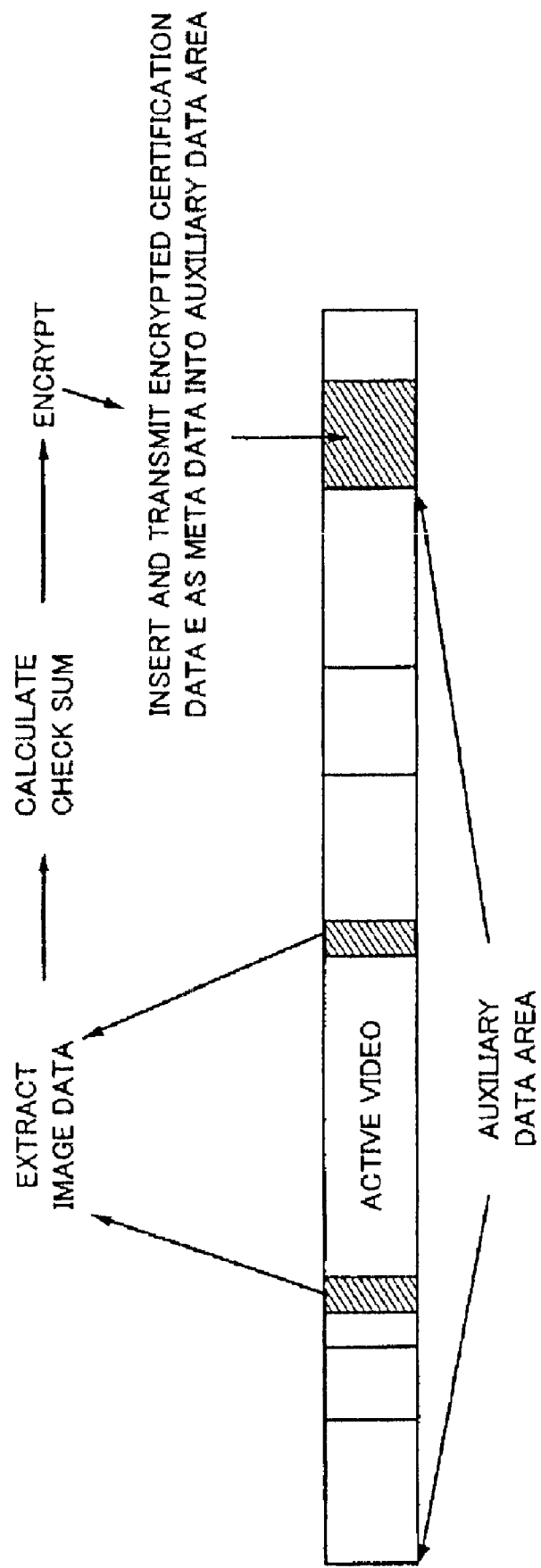

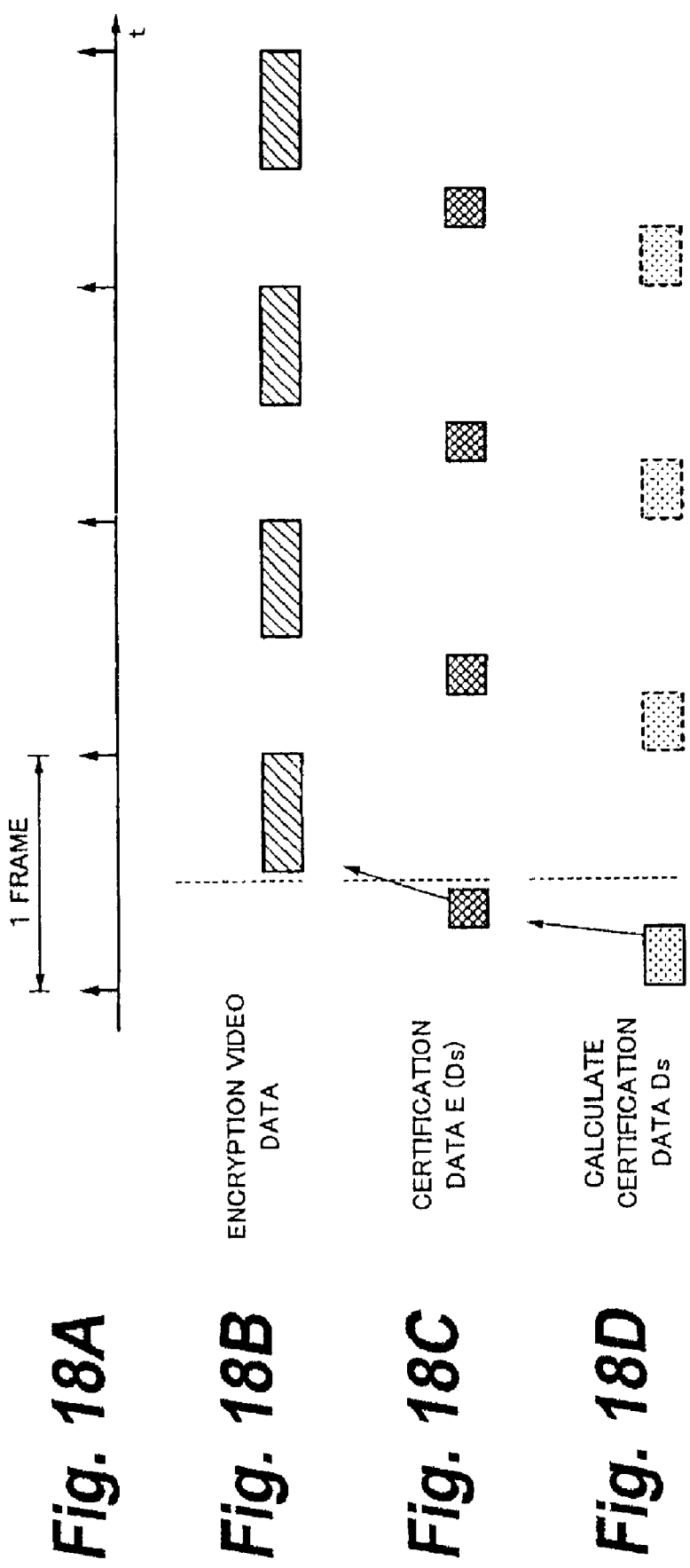

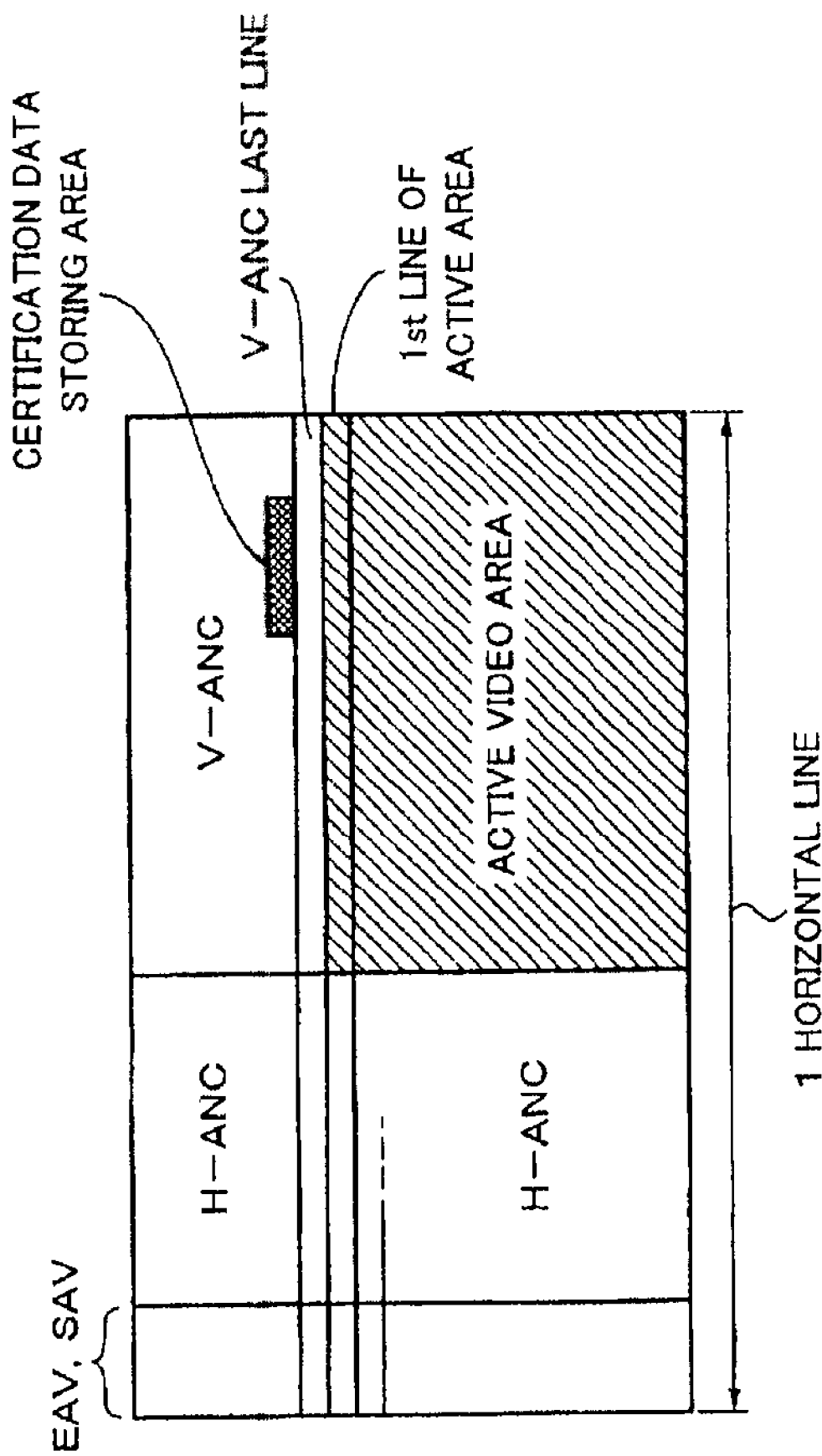

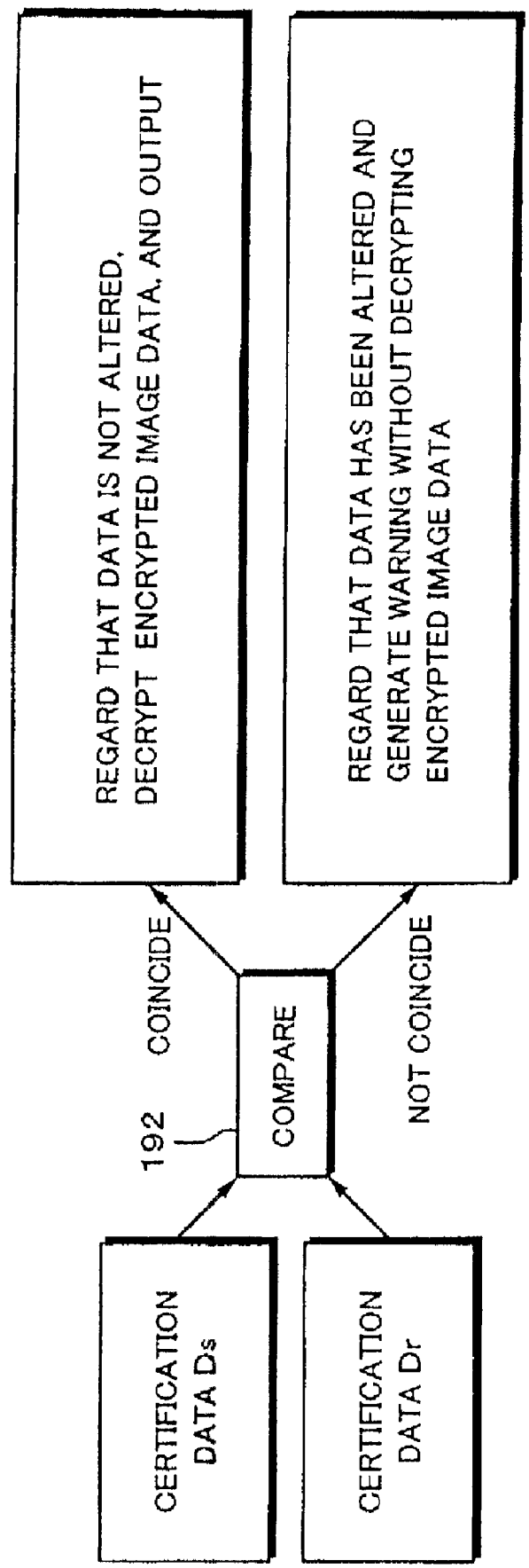

Fig. 24A    DISPLAY BLACK IMAGE    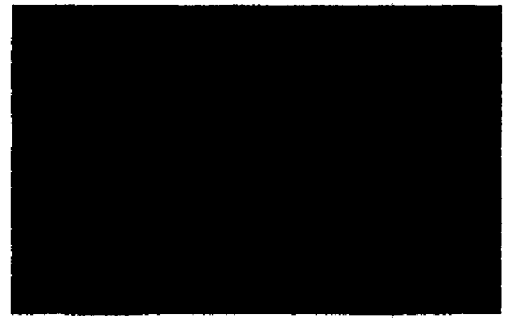
Fig. 24B    DISPLAY RANDOM NUMBER TRAIN    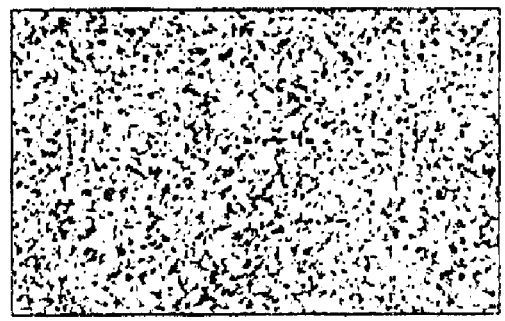
Fig. 24C    DISPLAY WARNING    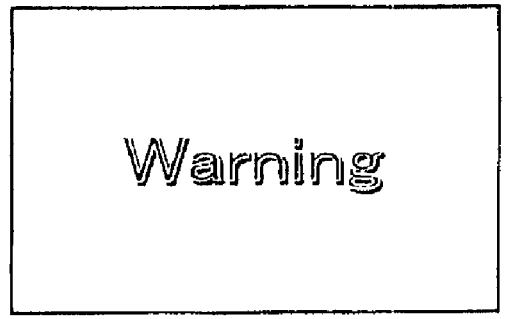
Fig. 24D    NO OUTPUT    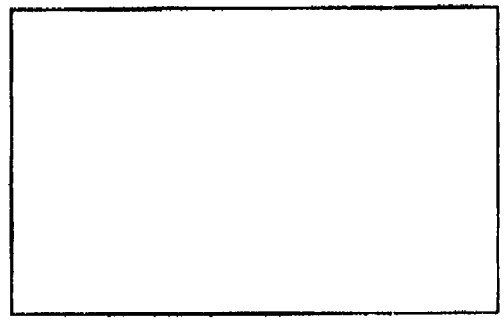

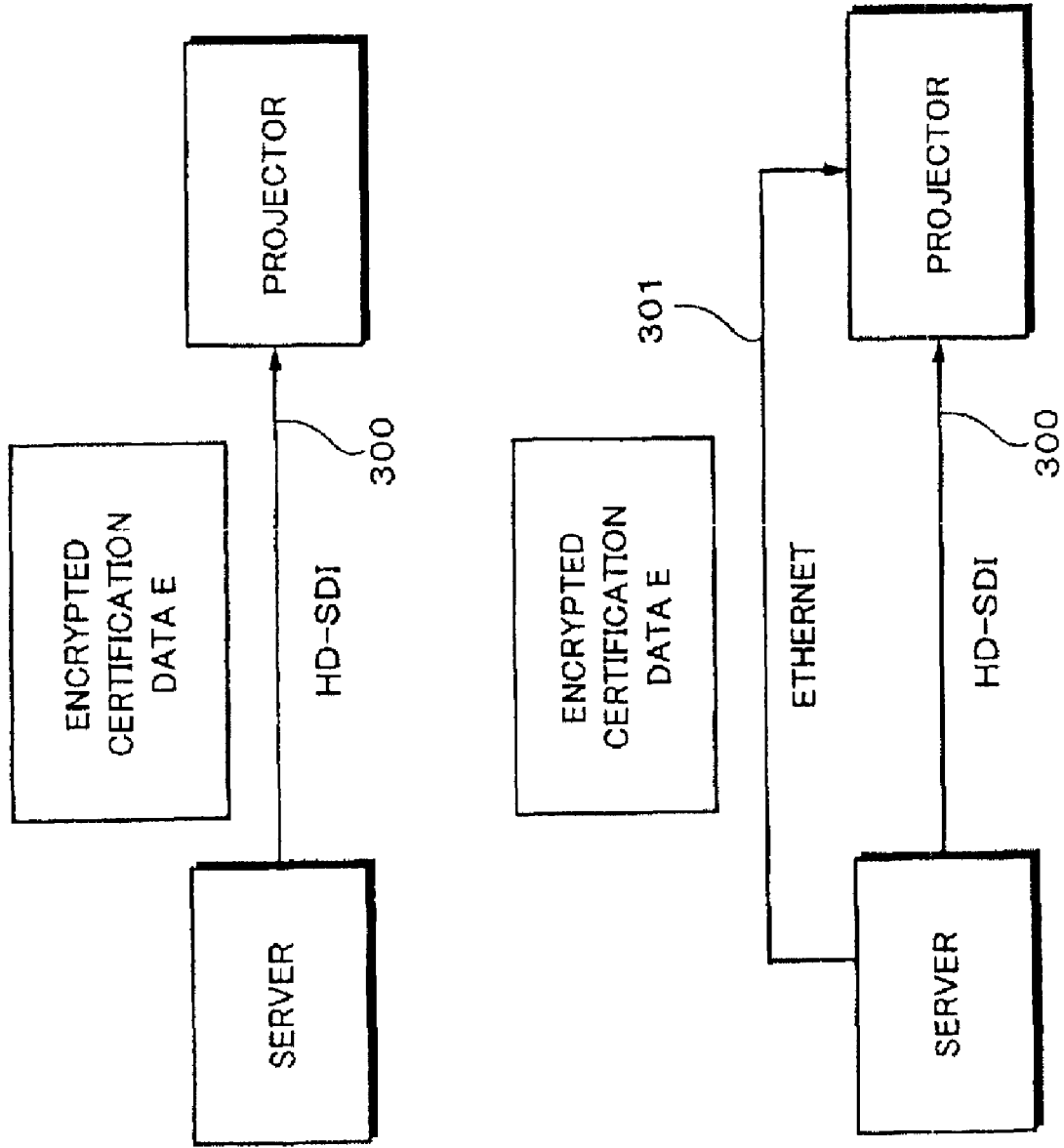

TRANSMITTING APPARATUS, RECEIVING APPARATUS, AND DATA TRANSMITTING SYSTEM

This is a division of application Ser. No. 10/572,162, filed Mar. 16, 2006, now U.S. Pat No. 7,885,407 pursuant to 35 USC 371 and based on International Application PCT/JP04/13979, filed Sept. 16, 2004, which is entitled to the priority filing date of Japanese application 2003-327519, filed in Japan on Sep. 19, 2003, the entirety of which is incorporated herein by reference.

TECHNICAL FIELD

The invention relates to an apparatus and a method which can confirm that transmitted data has been received by a reception side without being altered during the transmission, a receiving apparatus and its method, a data transmitting system, and a data transmitting method.

BACKGROUND ART

Hitherto, to prevent an illegal use such as exploitation, alteration, or the like of digital data, an encrypting technique for executing an encrypting process to the digital data which is transmitted has been put into practical use. FIG. 1 schematically shows a construction of an example of encrypting digital data. Original data before the encrypting process is executed is called a plain sentence (plain text). The plain text is encrypted by an encrypting block 400 and an encryption sentence (encryption data) is formed. The encryption of the encryption sentence is decrypted by a decrypting block 401 corresponding to the encrypting block 400 and the encryption sentence is returned to the original plain text.

As an encryption system which is used for the encrypting block 400, for example, an AES (Advanced Encryption Standard) and a DES (Data Encryption Standard) are typical systems. According to the AES and DES, the encryption of the plain text and the decryption of the encryption sentence are executed by using a non-open key called a secret key. For example, when the encrypting block 400 executes the encryption by the AES, the plain text inputted to the encrypting block 400 is encrypted by using a key 402 as a secret key. The encrypted encryption sentence is supplied to the decrypting block 401 through a transmission path, decrypted by using the same key 402 as that used upon encryption, and returned to the original plain text. Each of the AES and DES is a common key system using a common key in the encryption and decryption.

As a construction of the encrypting block 400 and the decrypting block 401, there is considered a construction using an encryptor 50 and a decryptor 51 according to the AES or DES as they are as an encrypting circuit and a decrypting circuit as shown in an example in FIGS. 2A and 2B. The construction of FIGS. 2A and 2B is called an ECB (Electronic Codebook mode) mode. In the construction of FIG. 2A, the encryptor 50 encrypts an inputted plain text Mi by using a key (K) by, for example, the AES and obtains an encryption sentence Ci. The encryption sentence Ci is inputted to the decryptor 51 and decrypted by using the key (K), so that the encryption sentence Ci is decrypted and the original plain text Mi is obtained (FIG. 2B).

In the construction of FIGS. 2A and 2B, when the same plain text is continuously inputted, the same values continue also in the encryption sentence which is outputted, so that the decryption of the key (K) based on the plain text and the encryption sentence becomes easy. Various methods are considered to solve such a problem.

FIGS. 3A and 3B show a construction for feeding back an output of the encryptor to an input and this construction is called a CBC mode (Cipher Block Chaining mode). In an encrypting circuit 60 shown in FIG. 3A, the plain text Mi is inputted to an encryptor 62 through an EXOR (exclusive OR) circuit 61 and encrypted by using the key (K). An output of the encryptor 62 is outputted as an encryption sentence Ci and, as an initial value IV, a predetermined delay of, for example, one word is given to it by a delay circuit 63. The delayed encryption sentence Ci is supplied to the EXOR circuit 61 and the exclusive OR with the plain text Mi is calculated. An output of the EXOR circuit 61 is inputted to the encryptor 62.

FIG. 3B shows the construction of a corresponding decrypting circuit 65. Upon decrypting, the encryption sentence Ci is inputted to a decryptor 66 and, as an initial value IV (initialization vector), a predetermined delay of, for example, one word is given to it by a delay circuit 67. The delayed encryption sentence Ci is supplied to an EXOR circuit 68. The encryption sentence Ci is encrypted by using the key (K) by the decryptor 66 and the exclusive OR with the initial value IV which has been delayed by the predetermined time is calculated by the EXOR circuit 68. The encryption sentence Ci is decrypted to the original plain text Mi and the original plain text Mi is outputted.

According to the construction shown in FIGS. 3A and 3B, by changing the initial value IV, even if the same key (K) is used, the different encryption sentences Ci are formed from the same plain text Mi. Since the encryption sentence Ci obtained by encrypting the plain text Mi is used as an initial value IV, even if the same plain text Mi is continuously inputted, the encryption sentence Ci encrypted by the encryptor 62 does not become the same sentence, so that an analysis of the encryption sentence becomes more difficult than that in the foregoing ECB mode.

FIGS. 4A and 4B show a construction in which a part of the generated encryption sentence Ci is fed back as an input of an encryptor and this construction is called a CFB mode (Cipher Feedback mode). In an encrypting circuit 70 shown in FIG. 4A, the plain text Mi inputted as j-bit data is supplied to an EXOR circuit 71 and the exclusive OR with j bits in an output of an encryptor 74 is calculated and the resultant sentence is outputted as an encryption sentence Ci. This output is supplied to a DR circuit 73 through a ξ circuit 72 for converting the number of bits from j bits to k bits. The DR circuit 73 has a shift register, by which the inputted data of k bits is shifted in input order, thereby generating data Xi of, for example, 128 bits. The data Xi is supplied to the encryptor 74 and encrypted by using the key (K), and data Yi of 128 bits is derived. The data Yi is a pseudo random number train. By calculating the exclusive OR of the data Yi and the plain text Mi which is inputted, the encryption sentence Ci is formed.

FIG. 4B shows the construction of a corresponding decrypting circuit 75. The encryption sentence Ci inputted as j-bit data is converted into the k-bit data by a (circuit 76, supplied to a DR circuit 78, and also supplied to an EXOR circuit 77. The DR circuit 78 has a shift register, by which the data Xi of, for example, 128 bits is formed from the supplied k-bit data. The data Xi is supplied to en encryptor 79. The data Xi is encrypted by the encryptor 79 by using the key (K) and becomes the data Yi of 128 bits. The data Yi is a pseudo random number train. By calculating the exclusive OR of the data Yi and the inputted encryption sentence Ci, the encryption sentence Ci is decrypted to the original plain text Mi.

According to the CFB mode, since the inputted plain text Mi or the encryption sentence Ci is inputted to the shift register and inputted to the encryptor, thereby generating the pseudo random number train, the CFB mode is suitable for encryption of stream data in which the plain text Mi is continuously inputted. On the other hand, there is such a drawback that if an error occurs in the encryption data outputted from the encrypting circuit 75, for example, by a transmitting system or the like, the circuit cannot be recovered from the error until the data is circulated in the shift register (DR circuit).

FIGS. 5A and 5B show a construction in which only an output of an encryptor is fed back to thereby generate pseudo random numbers and this construction is called an OFB mode (Output Feedback mode). In an encrypting circuit 80 shown in FIG. 5A, an output of an encryptor 83 itself is inputted to the encryptor 83 through a DR circuit 82 having a shift register and encrypted by using the key (K). The data Yi outputted from the encryptor 83 is a pseudo random number train. Only j bits in the data Yi are supplied to an EXOR 81 circuit and by calculating the exclusive OR of the data Yi and the plain text Mi which is inputted as j-bit data, the plain text Mi becomes the encryption sentence Ci and is outputted.

FIG. 5B shows the construction of a corresponding decrypting circuit 85. In the OFB mode, the decrypting circuit 85 has substantially the same construction as that of the encrypting circuit 80. That is, the encryption sentence Ci of j bits is inputted to an EXOR circuit 86. On the other hand, an output of an encryptor 88 itself is inputted to the encryptor 88 through a DR circuit 87 having a shift register and encrypted by using the key (K). The data Yi outputted from the encryptor 88 is a pseudo random number train. Only j bits in the data Yi are supplied to the EXOR circuit 86 and by calculating the exclusive OR of the data Yi and the inputted encryption sentence Ci, the encryption sentence Ci is decrypted to the plain text Mi.

According to the OFB mode, since the feedback is completed in the encrypting circuit 80 and the decrypting circuit 85, there is such an advantage that the data is not influenced by the transmitting system error or the like.

FIGS. 6A and 6B show a construction in which an output of a counter is sequentially counted up and given to an input of the encryptor and this construction is called a counter mode. That is, in the counter mode the output of the counter is encrypted and used. In an encrypting circuit 90 shown in FIG. 6A, a count value Xi which has sequentially been counted up by a counter 92 of a 128-bit output is inputted to an encryptor 93 and encrypted by using the key (K). The data Yi outputted from the encryptor 93 is a pseudo random number train. Only j bits in the data Yi are supplied to an EXOR circuit 91 and by calculating the exclusive OR of the data Yi and the plain text Mi inputted as j-bit data, the encryption sentence Ci is formed.

FIG. 6B shows a construction of a corresponding decrypting circuit 95. In the counter mode, the decrypting circuit 95 has substantially the same construction as that of the encrypting circuit 90. That is, the count value Xi which has sequentially been counted up by a counter 97 is inputted to an encryptor 98 and encrypted by using the key (K). The data Yi outputted from the encryptor 98 is a pseudo random number train. Only j bits in the data Yi are supplied to an EXOR circuit 96 and by calculating the exclusive OR of the data Yi and the encryption sentence Ci inputted as j-bit data, the encryption sentence Ci is decrypted to the plain text Mi.

As mentioned above, in the CFB mode, OFB mode, and counter mode, the encryption sentence Ci is decrypted by calculating the exclusive OR of the same pseudo random numbers as those used for the encryption and the encryption sentence Ci. The various encrypting systems as mentioned above have been disclosed in Document "Foundation of Encryption Theory" (author: Douglas R. Stinson, translated by Koichi Sakurai, published by Kyoritsu Shuppan Co., Ltd., issued in 1996).

In recent years, for example, a digital cinema system in which video data accumulated in a video server is reproduced and projected onto a screen to thereby play a movie in a movie theater or the like has been proposed. According to such a system, for example, video data distributed through a network or video data recorded in a recording medium such as an optical disk or the like of a large capacity is supplied to the video server. The video data is transmitted from the video server to a projector through, for example, a coaxial cable, and a video image based on the video data is projected onto the screen by the projector.

The video data is transmitted as serial digital data from the video server to the projector by a transmitting format according to, for example, an HD-SDI (High Definition-Serial Data Interface). This video data is transmitted as video data of a base band and its transmission rate is set to, for example, about 1.5 Gbps (Giga bits per second).

At this time, to prevent the exploitation of the video data, the video data which is outputted from the video server is encrypted and the encrypted video data is outputted to, for example, the coaxial cable and transmitted to the projector. In this instance, if there is no restriction in codes which are transmitted in the format of the HD-SDI, an encrypting/decrypting system of the HD-SDI can be realized by using each of the foregoing encrypting systems. That is, an encrypting circuit is provided for the video server side and the video data which is outputted is encrypted. A decrypting circuit corresponding to the encrypting circuit of the video server is provided for the projector side. The video data encrypted by the video server is transmitted to the projector in the format of the HD-SDI through the coaxial cable, the encryption is decrypted by the decrypting circuit of the projector, and the decrypted data is returned to the video data of the base band.

However, actually, inhibition codes for word synchronization have been defined in the foregoing HD-SDI. Therefore, a system for making the encryption without generating any inhibition code has already been filed by the applicant of the present invention as Japanese Patent Application No. 2002-135039. As related applications of such an application, Japanese Patent Application Nos. 2002-135079, 2002-135092, 2002-173523, and 2002-349373 have already been filed.

Further, in recent years, the standardization regarding the encryption/decryption of the video data in the HD-SDI has been progressed. It has been proposed that the counter mode described with reference to FIGS. 6A and 6B is used as an encrypting system. According to such a proposition, the data of 128 bits as an encryption unit is divided and used and the following three kinds of counters are applied to the divided bits, respectively.

(1) Clock counter which is counted up every clock of the encryptor
(2) Line counter which is counted up every line of the video data
(3) Frame counter which is counted up every frame of the video data Among those three kinds of counters, the clock counter of (1) is reset each time the line is updated. The line counter of (2) is reset each time the frame is updated. The frame counter of (3) is reset only once when one program according to the video data is started. By combining and using a plurality of counters whose counting periods are different and whose reset timing are different as mentioned above, even if pullout, data dropout, or the like occurs in the transmitting system of the data, for example, an amount of data which is lost, that is, the data which cannot be decrypted can be set to the data of one line at most.

Even if the resetting by the clock counter of (1) or the line counter of (2) is executed, since the value of the frame counter of (3) is sequentially updated, there is also such an advantage that the same pseudo random number train is not repeated.

An exploiting method of the video data in the above digital cinema system will now be considered. FIG. 7 schematically shows a system of an example for realizing the exploitation of the video data. The video data is reproduced and encrypted by a video server 250 and sent as encryption data to a coaxial cable 251. As an encrypting system, in consideration of reconstructing performance for the error of the transmitting system, the method of resetting the counters every line of the video data, every frame, and at the head of the program is used in the foregoing counter mode. On a projector 254 side, inherently, the data which is sent through the coaxial cable 251 connected to the projector 254 is received, the encryption is decrypted to thereby form the video data of the base band, and this video data is displayed on a screen 255.

The exploiter of the video data prepares a data exploitation recording/exchanging apparatus 252, a video camera 256, and a video data recording apparatus 257. The data exploitation recording/exchanging apparatus 252 is inserted between the video server 250 and the projector 254. For example, as shown in FIG. 7, the coaxial cable 251 to connect the video server 250 and the projector 254 is connected to the data exploitation recording/exchanging apparatus 252 and an output of the data exploitation recording/exchanging apparatus 252 is sent to the projector 254 by a coaxial cable 253. The video camera 256 is arranged so that it can photograph a video image projected onto the screen 255. The video image photographed by the video camera 256 is supplied to the video data recording apparatus 257 and recorded onto a recording medium such as optical disk, magnetic tape, or the like.

In such a construction, the exploiter records the encryption data which is outputted from the video server 250 and in which the video data has been encrypted and meta data accompanied to the video data by the data exploitation recording/exchanging apparatus 252. In place of the encryption data supplied from the video server 250, the data exploitation recording/exchanging apparatus 252 outputs predetermined data which has been prepared together with the meta data which has been accompanied to the encryption data and supplied from the video server 250. At this time, the meta data is not modified. The predetermined data which has been prepared by the data exploitation recording/exchanging apparatus 252 is a fixed value to display, for example, a full black display image. That is, the video data outputted from the video server 250 is altered to the predetermined data by the data exploitation recording/exchanging apparatus 252 and outputted.

The predetermined data and the meta data outputted from the data exploitation recording/exchanging apparatus 252 are supplied to the projector 254. The supplied predetermined data is decrypted in the projector 254. That is, if the predetermined data is fixed data to display the full black image, the exclusive OR of the predetermined data and the pseudo random numbers in the decrypting circuit is calculated. The video data obtained by calculating the exclusive OR of the predetermined data and the pseudo random numbers is projected onto the screen 255.

As mentioned above, since the video image which is projected onto the screen 255 is based on, for example, the data in which the pseudo random numbers by the encrypting circuit are made to act on the predetermined data as a fixed value, an obtained picture quite differs from the original video data outputted from the video server 250 and becomes a video image which is merely seen as noises. The exploiter photographs the video image according to the foregoing predetermined data projected onto the screen 255 by the video camera 256 and records it by the video data recording apparatus 257. The original video data of the encryption data can be reconstructed on the basis of the encryption data recorded by the data exploitation recording/exchanging apparatus 252 and the video data recorded by the video data recording apparatus 257.

That is, there is such a problem that if projecting performance of the projector 254 and photographing performance of the video camera 256 are ideal, by calculating the exclusive OR of the encryption data and the video data, the original video data of the encryption data can be reconstructed.

Actually, since the projector 254 and the video camera 256 having the ideal performance do not exist, the original video data cannot be accurately reconstructed even by the above method. However, even if imperfect data is used, by executing the above calculation, the original video data can be reconstructed at a high probability.

For example, as a nature of the video data, it has been known that there is a high correlation between a certain pixel and a pixel adjacent thereto. In the situation as mentioned above, a value of the pixel which could not be accurately reconstructed can be obtained by using the correlation of the adjacent image. Thus, the pseudo random numbers at the time when the pixel (video data) is encrypted can be narrowed down. There is, consequently, such a problem that a large clue to decode the key (K) upon encryption of the video data is got by the exploiter.

By using the data which has been altered to the predetermined data by the exploiter in place of the video data which is outputted from the video server 250 as mentioned above, the encryption of the video data encrypted by the video server 250 can be easily decoded.

DISCLOSURE OF INVENTION

It is, therefore, an object of the invention to provide an apparatus and a method which can prevent exploitation of video data due to alteration of the video data, a receiving apparatus and its method, a data transmitting system, and a data transmitting method.

To solve the above problems, according to the invention, there is provided a transmitting apparatus comprising: encrypting means for encrypting a part or all of data in accordance with a predetermined rule and outputting the encrypted data; data extracting means for extracting predetermined data from the data; arithmetic operating means for executing a predetermined arithmetic operation to the predetermined data extracted by the data extracting means and outputting arithmetic operation resultant data; and data inserting means for inserting the arithmetic operation resultant data to an output of the encrypting means and transmitting the resultant data to a transmission path.

According to the invention, there is provided a transmitting method comprising: an encrypting step of encrypting a part or all of data in accordance with a predetermined rule and outputting the encrypted data; a data extracting step of extracting predetermined data from the data; an arithmetic operating step of executing a predetermined arithmetic operation to the predetermined data extracted in the data extracting step and outputting arithmetic operation resultant data; and a data inserting step of inserting the arithmetic operation resultant data to an output in the encrypting step and transmitting the resultant data to a transmission path.

According to the invention, there is provided a transmitting program for allowing a computer apparatus to execute a transmitting method comprising: an encrypting step of encrypting a part or all of data in accordance with a predetermined rule and outputting the encrypted data; a data extracting step of extracting predetermined data from the data; an arithmetic operating step of executing a predetermined arithmetic operation to the predetermined data extracted in the data extracting step and outputting arithmetic operation resultant data; and a data inserting step of inserting the arithmetic operation resultant data to an output in the encrypting step and transmitting the resultant data to a transmission path.

According to the invention, there is provided a recording medium which can be read by a computer apparatus and in which a transmitting program for allowing the computer apparatus to execute a transmitting method has been recorded, wherein the transmitting method comprises: an encrypting step of encrypting a part or all of data in accordance with a predetermined rule and outputting the encrypted data; a data extracting step of extracting predetermined data from the data; an arithmetic operating step of executing a predetermined arithmetic operation to the predetermined data extracted in the data extracting step and outputting arithmetic operation resultant data; and a data inserting step of inserting the arithmetic operation resultant data to an output in the encrypting step and transmitting the resultant data to a transmission path.

According to the invention, there is provided a receiving apparatus which receives data on a transmission path obtained by encrypting a part or all of data in accordance with a predetermined rule, outputting the encrypted data, extracting predetermined data from the data, executing a predetermined arithmetic operation to the extracted predetermined data, obtaining arithmetic operation resultant data as a result of the arithmetic operation, inserting the arithmetic operation resultant data to the encryption output, and transmitting the resultant encryption data to the transmission path, comprising first data extracting means for extracting data corresponding to the arithmetic operation resultant data from the data received through the transmission path; decrypting means for decrypting the encryption of the received data on the basis of a predetermined rule and outputting the decrypted data; second data extracting means for extracting data corresponding to the predetermined data from an output of the decrypting means; arithmetic operating means for executing the same arithmetic operation as the arithmetic operation to the data which corresponds to the predetermined data and has been extracted by the second data extracting means; comparing means for comparing the data extracted by the first data extracting means with arithmetic operation resultant data from the arithmetic operating means; and switching means for switching the output of the decrypting means and another output in accordance with a comparison result of the comparing means.

According to the invention, there is provided a receiving method which receives data on a transmission path obtained by encrypting a part or all of data in accordance with a predetermined rule, outputting the encrypted data, extracting predetermined data from the data, executing a predetermined arithmetic operation to the extracted predetermined data, obtaining arithmetic operation resultant data as a result of the arithmetic operation, inserting the arithmetic operation resultant data to the encryption output, and transmitting the resultant encryption data to the transmission path, comprising: a first data extracting step of extracting data corresponding to the arithmetic operation resultant data from the data received through the transmission path; a decrypting step of decrypting the encryption of the received data on the basis of a predetermined rule and outputting the decrypted data; a second data extracting step of extracting data corresponding to the predetermined data from an output of the decrypting step; an arithmetic operating step of executing the same arithmetic operation as the arithmetic operation to the data which corresponds to the predetermined data and has been extracted in the second data extracting step; a comparing step of comparing the data extracted in the first data extracting step with an arithmetic operation result in the arithmetic operating step; and a switching step of switching the output in the decrypting step and another output in accordance with a comparison result in the comparing step.

According to the invention, there is provided a receiving program for allowing a computer apparatus to execute a receiving method which receives data on a transmission path obtained by encrypting a part or all of data in accordance with a predetermined rule, outputting the encrypted data, extracting predetermined data from the data, executing a predetermined arithmetic operation to the extracted predetermined data, obtaining arithmetic operation resultant data as a result of the arithmetic operation, inserting the arithmetic operation resultant data to the encryption output, and transmitting the resultant encryption data to the transmission path, wherein the receiving method comprises: a first data extracting step of extracting data corresponding to the arithmetic operation resultant data from the data received through the transmission path; a decrypting step of decrypting the encryption of the received data on the basis of a predetermined rule and outputting the decrypted data; a second data extracting step of extracting data corresponding to the predetermined data from an output of the decrypting step; an arithmetic operating step of executing the same arithmetic operation as the arithmetic operation to the data which corresponds to the predetermined data and has been extracted in the second data extracting step; a comparing step of comparing the data extracted in the first data extracting step with an arithmetic operation result in the arithmetic operating step; and a switching step of switching the output in the decrypting step and another output in accordance with a comparison result in the comparing step.

According to the invention, there is provided a recording medium which can be read by a computer apparatus and in which a receiving program for allowing the computer apparatus to execute a receiving method has been recorded, in which the receiving method receives data on a transmission path obtained by encrypting a part or all of data in accordance with a predetermined rule, outputting the encrypted data, extracting predetermined data from the data, executing a predetermined arithmetic operation to the extracted predetermined data, obtaining arithmetic operation, resultant data as a result of the arithmetic operation, inserting the arithmetic operation resultant data to the encryption output, and transmitting the resultant encryption data to the transmission path, wherein the receiving method comprises: a first data extracting step of extracting data corresponding to the arithmetic operation resultant data from the data received through the transmission path; a decrypting step of decrypting the encryption of the received data on the basis of a predetermined rule and outputting the decrypted data; a second data extracting step of extracting data corresponding to the predetermined data from an output of the decrypting step; an arithmetic operating step of executing the same arithmetic operation as the arithmetic operation to the data which corresponds to the predetermined data and has been extracted in the second data extracting step; a comparing step of comparing the data extracted in the first data extracting step with arithmetic operation resultant data in the arithmetic operating step; and a switching step of switching the output in the decrypting step and another output in accordance with a comparison result in the comparing step.

According to the invention, there is provided a data transmitting system comprising: a transmitting apparatus having encrypting means for encrypting a part or all of input data in accordance with a predetermined rule and outputting the encrypted data, first data extracting means for extracting predetermined data from the input data, first arithmetic operating means for executing a predetermined arithmetic operation to the predetermined data extracted by the first data extracting means and outputting first arithmetic operation resultant data, and data inserting means for inserting the first arithmetic operation resultant data to an output of the encrypting means and transmitting the resultant data to a transmission path; and a receiving apparatus having second data extracting means for extracting the first arithmetic operation resultant data from the data received through the transmission path, decrypting means for decrypting the encryption of the received data on the basis of the predetermined rule and outputting the decrypted data, third data extracting means for extracting data corresponding to the predetermined data from an output of the decrypting means, second arithmetic operating means for executing the same arithmetic operation as that of the first arithmetic operating means to the data which corresponds to the predetermined data and has been extracted by the third data extracting means and outputting second arithmetic operation resultant data, comparing means for comparing the first arithmetic operation resultant data extracted by the second data extracting means with the second arithmetic operation resultant data from the second arithmetic operating means, and switching means for switching the output of the decrypting means and another output in accordance with a comparison result of the comparing means.

According to the invention, there is provided a data transmitting method comprising: an encrypting step of encrypting a part or all of input data in accordance with a predetermined rule and outputting the encrypted data; a first data extracting step of extracting predetermined data from the input data; a first arithmetic operating step of executing a predetermined arithmetic operation to the predetermined data extracted in the first data extracting step and outputting first arithmetic operation resultant data; a data inserting step of inserting the first arithmetic operation resultant data to an output of the encrypting step and transmitting the resultant data to a transmission path; a second data extracting step of extracting the first arithmetic operation resultant data from the data received through the transmission path; a decrypting step of decrypting the encryption of the received data on the basis of the predetermined rule and outputting the decrypted data; a third data extracting step of extracting data corresponding to the predetermined data from an output of the decrypting step a second arithmetic operating step of executing the same arithmetic operation as that of the first arithmetic operating step to the data which corresponds to the predetermined data and has been extracted in the third data extracting step and outputting second arithmetic operation resultant data; a comparing step of comparing the first arithmetic operation resultant data extracted in the second data extracting step with the second arithmetic operation resultant data in the second arithmetic operating step; and a switching step of switching the output of the decrypting step and another output in accordance with a comparison result in the comparing step.

According to the invention, there is provided a transmitting apparatus comprising: first encrypting means for encrypting a part or all of data by using a first key and outputting the encrypted data; data extracting means for extracting predetermined data from the data on the basis of random numbers generated in accordance with a predetermined rule in accordance with random number control information; arithmetic operating means for executing a predetermined arithmetic operation to the predetermined data extracted by the data extracting means and outputting arithmetic operation resultant data; second encrypting means for encrypting the arithmetic operation resultant data by using a second key and outputting the encrypted data; and data inserting means for inserting an output of the second encrypting means to an output of the first encrypting means and transmitting the resultant data to a transmission path.

According to the invention, there is provided a transmitting method comprising: a first encrypting step of encrypting a part or all of data by using a first key and outputting the encrypted data; a data extracting step of extracting predetermined data from the data on the basis of random numbers generated in accordance with a predetermined rule in accordance with random number control information; an arithmetic operating step of executing a predetermined arithmetic operation to the predetermined data extracted in the data extracting step and outputting arithmetic operation resultant data; a second encrypting step of encrypting the arithmetic operation resultant data in accordance with a predetermined rule by using a second key and outputting the encrypted data; and a data inserting step of inserting an output in the second encrypting step to an output in the first encrypting step and transmitting the resultant data to a transmission path.

According to the invention, there is provided a transmitting program for allowing a computer apparatus to execute a transmitting method comprising: a first encrypting step of encrypting a part or all of data by using a first key and outputting the encrypted data; a data extracting step of extracting predetermined data from the data on the basis of random numbers generated in accordance with a predetermined rule in accordance with random number control information; an arithmetic operating step of executing a predetermined arithmetic operation to the predetermined data extracted in the data extracting step and outputting arithmetic operation resultant data; a second encrypting step of encrypting the arithmetic operation resultant data in accordance with a predetermined rule by using a second key and outputting the encrypted data; and a data inserting step of inserting an output in the second encrypting step to an output in the first encrypting step and transmitting, the resultant data to a transmission path.

According to the invention, there is provided a recording medium which can be read by a computer apparatus and in which a transmitting program for allowing the computer apparatus to execute a transmitting method has been recorded, wherein the transmitting method comprises: a first encrypting step of encrypting a part or all of data by using a first key and outputting the encrypted data; a data extracting step of extracting predetermined data from the data on the basis of random numbers generated in accordance with a predetermined rule in accordance with random number control information; an arithmetic operating step of executing a predetermined arithmetic operation to the predetermined data extracted in the data extracting step and outputting arithmetic operation resultant data; a second encrypting step of encrypting the arithmetic operation resultant data in accordance with a predetermined rule by using a second key and outputting the encrypted data; and a data inserting step of inserting an output in the second encrypting step to an output in the first encrypting step and transmitting the resultant data to a transmission path.

According to the invention, there is provided a receiving apparatus which receives data on a transmission path obtained by encrypting a part or all of data by using a first key in accordance with a predetermined rule, outputting the encrypted data, extracting predetermined data from the data on the basis of random numbers generated in accordance with a predetermined rule in accordance with random number control information, executing a predetermined arithmetic operation to the extracted predetermined data, encrypting arithmetic operation resultant data as a result of the arithmetic operation by using a second key in accordance with a predetermined rule, inserting the encrypted arithmetic operation resultant data to the encryption output, and transmitting the resultant encryption data to the transmission path, comprising: first data extracting means, for extracting data corresponding to the encrypted arithmetic operation resultant data from the data received through the transmission path; first decrypting means for decrypting the encrypted arithmetic operation resultant data extracted by the first data extracting means by using a third key in accordance with a predetermined rule; second decrypting means for decrypting the encryption formed by using the first key of the received data by using a fourth key in accordance with a predetermined rule and outputting the decrypted data; second data extracting means for extracting data corresponding to the predetermined data from an output of the second decrypting means on the basis of the random numbers generated in accordance with the predetermined rule in accordance with the random number control information; arithmetic operating means for executing the same arithmetic operation as the arithmetic operation to the data which corresponds to the predetermined data and has been extracted by the second data extracting means; comparing means for comparing the arithmetic operation resultant data decrypted by the first decrypting means with arithmetic operation resultant data from the arithmetic operating means; and switching means for switching the output of the second decrypting means and another output in accordance with a comparison result of the comparing means.

According to the invention, there is provided a receiving method which receives data on a transmission path obtained by encrypting a part or all of data by using a first key in accordance with a predetermined rule, outputting the encrypted data, extracting predetermined data from the data on the basis of random numbers generated in accordance with a predetermined rule in accordance with random number control information, executing a predetermined arithmetic operation to the extracted predetermined data, encrypting arithmetic operation resultant data as a result of the arithmetic operation by using a second key in accordance with a predetermined rule, inserting the encrypted arithmetic operation resultant data to the encryption output, and transmitting the resultant encryption data to the transmission path, comprising: a first data extracting step of extracting data corresponding to the encrypted arithmetic operation resultant data from the data received through the transmission path; a first decrypting step of decrypting the encrypted arithmetic operation resultant data extracted in the first data extracting step by using a third key in accordance with a predetermined rule; a second decrypting Step of decrypting a part or all of encryption formed by using the first key of the received data by using, a fourth key in accordance with a predetermined rule and outputting the decrypted data; a second data extracting step of extracting data corresponding to the predetermined data from an output of the second decrypting step: on the basis of the random numbers generated in accordance with the predetermined rule in accordance with the random number control information; an arithmetic operating step of executing the same arithmetic operation as the arithmetic operation to the data which corresponds to the predetermined data and has been extracted in the second data extracting step; a comparing step of comparing the arithmetic operation resultant data decrypted in the first decrypting step with arithmetic operation resultant data in the arithmetic operating step; and a switching step of switching the output of the second decrypting step and another output in accordance with a comparison result in the comparing step.

According to the invention, there is provided a receiving program for allowing a computer apparatus to execute a receiving method which receives data on a transmission path obtained by encrypting a part or all of data by using a first key in accordance with a predetermined rule, outputting the encrypted data, extracting, predetermined data from the data on the basis of random numbers generated in accordance with a predetermined rule in accordance with random number control information, executing a predetermined arithmetic operation to the extracted predetermined-data, encrypting arithmetic operation resultant data as a result of the arithmetic operation by using a second key in accordance with a predetermined rule, inserting the encrypted arithmetic operation resultant data to the encryption output, and transmitting the resultant encryption data to the transmission path, wherein the receiving method comprises: a first data extracting step of extracting data corresponding to the encrypted arithmetic operation resultant data from the data received through the transmission path; a first decrypting step of decrypting the encrypted arithmetic operation resultant data extracted in the first data extracting step by using a third key in accordance with a predetermined rule; a second decrypting step of decrypting a part or all of encryption formed by using the first key of the received data by using a fourth key in accordance with a predetermined rule and outputting the decrypted data; a second data extracting step of extracting data corresponding to the predetermined data from an output of the second decrypting step on the basis of the random numbers generated in accordance with the predetermined rule in accordance with the random number control information; an arithmetic operating step of executing the same arithmetic operation as the arithmetic operation to the data which corresponds to the predetermined data and has been extracted in the second data extracting step; a comparing step of comparing the arithmetic operation resultant data decrypted in the first decrypting step with arithmetic operation resultant data in the arithmetic operating step; and a switching step of switching the output of the second decrypting step and another output in accordance with a comparison result in the comparing step.

According to the invention, there is provided a recording medium which can be read by a computer apparatus and in which a receiving program for allowing the computer apparatus to execute a receiving method has been recorded, in which the receiving method receives data on a transmission path obtained by encrypting a part or all of data by using a first key in accordance with a predetermined rule, outputting the encrypted data, extracting predetermined data from the data on the basis of random numbers generated in accordance with a predetermined rule in accordance with random number control information, executing a predetermined arithmetic operation to the extracted predetermined data, encrypting arithmetic operation resultant data as a result of the arithmetic operation by using a second key in accordance with a predetermined rule, inserting the encrypted arithmetic operation resultant data to the encryption output, and transmitting the resultant encryption data to the transmission path, wherein the receiving method comprises: a first data extracting step of extracting data corresponding to the encrypted arithmetic operation resultant data from the data received through the transmission path; a first decrypting step of decrypting the encrypted arithmetic operation resultant data extracted in the first data extracting step by using a third key in accordance with a predetermined rule; a second decrypting step of decrypting a part or all of encryption formed by using the first key of the received data by using a fourth key in accordance with a predetermined rule and outputting the decrypted data; a second data extracting step of extracting data corresponding to the predetermined data from an output of the second decrypting step on the basis of the random numbers generated in accordance with the predetermined rule in accordance with the random number control information; an arithmetic operating step of executing the same arithmetic operation as the arithmetic operation to the data which corresponds to the predetermined data and has been extracted in the second data extracting step; a comparing step of comparing the arithmetic operation resultant data decrypted in the first decrypting step with arithmetic operation resultant data in the arithmetic operating step; and a switching step of switching the output of the second decrypting step and another output in accordance with a comparison result in the comparing step.

According to the invention, there is provided a data transmitting system comprising: a transmitting apparatus having first encrypting means for encrypting a part or all of input data by using a first key and outputting the encrypted data, first data extracting means for extracting predetermined data from the data on the basis of random numbers generated in accordance with a predetermined rule in accordance with first random number control information, first arithmetic operating means for executing a predetermined arithmetic operation to the predetermined data extracted by the data extracting means and outputting first arithmetic operation resultant data, second encrypting means for encrypting the first arithmetic operation resultant data by using a second key and outputting the encrypted data, and data inserting means for inserting an output of the second encrypting means to an output of the first encrypting means and transmitting the resultant data to a transmission path; and a receiving apparatus having second data extracting means for extracting data corresponding to the output of the second encrypting means from the data received through the transmission path, first decrypting means for decrypting the data which corresponds to the output of the second encrypting means and has been extracted by the second data extracting means by using a third key in accordance with a predetermined rule, second decrypting means for decrypting a part or all of the received data by using a fourth key in accordance with a predetermined rule and outputting the decrypted data, third data extracting means for extracting data corresponding to the predetermined data from an output of the second decrypting means on the basis of the random numbers generated in accordance with the predetermined rule in accordance with second random number control information, second arithmetic operating means for executing an arithmetic operation corresponding to the arithmetic operation to the data which corresponds to the predetermined data and has been extracted by the third data extracting means and outputting second arithmetic operation resultant data, comparing means for comparing the first arithmetic operation resultant data decrypted by the first decrypting means with the second arithmetic operation resultant data, and switching means for switching the output of the second decrypting means and another output in accordance with a comparison result of the comparing means.

According to the invention, there is provided a data transmitting method comprising: a first encrypting step of encrypting a part or all of input data by using a first key and outputting the encrypted data; a first data extracting step of extracting predetermined data from the data on the basis of random numbers generated in accordance with a predetermined rule in accordance with first random number control information; a first arithmetic operating step of executing a predetermined arithmetic operation to the predetermined data extracted in the data extracting step and outputting first arithmetic operation resultant data; a second encrypting step of encrypting the first arithmetic operation resultant data by using a second key and outputting the encrypted data; a data inserting step of inserting an output of the second encrypting step to an output of the first encrypting step and transmitting the resultant data to a transmission path; a second data extracting step of extracting data corresponding to the output of the second encrypting step from the data received through the transmission path; a first decrypting step of decrypting the data which corresponds to the output of the second encrypting step and has been extracted in the second data extracting step by using a third key in accordance with a predetermined rule; a second decrypting step of decrypting, the encryption formed by using the first key of the received data by using a fourth key in accordance with a predetermined rule and outputting the decrypted data; a third data extracting step of extracting data corresponding to the predetermined data from an output of the second decrypting step on the basis of the random numbers generated in accordance with the predetermined rule in accordance with second random number control information; a second arithmetic operating step of executing the same arithmetic operation as the arithmetic operation to the data which corresponds to the predetermined data and has been extracted in the third data extracting step and outputting second arithmetic operation resultant data; a comparing step of comparing the first arithmetic operation resultant data decrypted by the first decrypting step with the second arithmetic operation resultant data; and a switching step of switching the output of the second decrypting step and another output in accordance with a comparison result of the comparing step.

As mentioned above, according to the invention, a part or all of the data is encrypted in accordance with the predetermined rule and the encrypted data is outputted. The predetermined data is extracted from the data, the predetermined arithmetic operation is executed, and the arithmetic operation resultant data is outputted. The arithmetic operation resultant data is inserted to the encryption output and the resultant encryption data is transmitted to the transmission path. Therefore, on the receiving apparatus side, the data corresponding to the predetermined data used for the predetermined arithmetic operation on the transmitting apparatus side is extracted from the data obtained by decrypting the encryption data. The same arithmetic operation as the predetermined arithmetic operation of the transmitting apparatus side is executed. The arithmetic operation resultant data is compared with the arithmetic operation data inserted to the encryption data, thereby making it possible to discriminate whether or not there is a possibility that the transmitted data has been altered.

According to the invention, a part or all of the data is encrypted in accordance with the predetermined rule and the encrypted data is outputted. The predetermined data is extracted from the data, the predetermined arithmetic operation is executed, and the arithmetic operation resultant data as a result of the arithmetic operation is obtained. The arithmetic operation resultant data is inserted to the encryption output, the resultant encryption data is transmitted to the transmission path, and the data on the transmission path is received. The data corresponding to the arithmetic operation result is extracted from the received data. The data corresponding to the predetermined data used for the predetermined arithmetic operation on the transmitting apparatus side is extracted from the data obtained by decrypting the encryption data and the same arithmetic operation as that of the transmitting apparatus side is executed. The arithmetic operation result is compared with the arithmetic operation resultant data extracted from the received data, thereby making it possible to discriminate whether or not there is a possibility that the transmitted data has been altered. Further, the output obtained by decrypting the encryption data and another output are switched in accordance with the comparison result and outputted. Therefore, if it is determined that there is a possibility that the data has been altered, another data can be outputted without outputting the data obtained by decrypting the encryption data.

According to the invention, a part or all of the data is encrypted by using, the first key and the encrypted data is outputted. The predetermined data is extracted from the data on the basis of random numbers generated in accordance with the predetermined rule in accordance with the random number control information and the predetermined arithmetic operation is executed, thereby obtaining the arithmetic operation resultant data. The arithmetic operation result is encrypted by using the second key and outputted. The arithmetic operation result encrypted by using the second key is inserted to the encryption data encrypted by using the first key and the resultant encryption data is transmitted to the transmission path. Therefore, on the receiving apparatus side, on the basis of random numbers generated in accordance with the predetermined rule in accordance with the random number control information in a manner similar to the transmitting apparatus side, the predetermined data is extracted from the data obtained by decrypting the encryption data. The arithmetic operation resultant data obtained by executing the same arithmetic operation as the predetermined arithmetic operation of the transmitting apparatus side to the extracted predetermined data is compared with the data obtained by decrypting the encrypted arithmetic operation data inserted to the encryption data, thereby making it possible to discriminate whether or not there is a possibility that the transmitted data has been altered. Further, on the transmitting apparatus, side, the predetermined data to obtain the arithmetic operation resultant data is extracted on the basis of random numbers generated in accordance with the random number control information and the obtained arithmetic operation resultant data is encrypted by using the second key and transmitted. Therefore, the arithmetic operation resultant data which is obtained on the transmitting apparatus side cannot be easily presumed.

According to the invention, a part or all of the data is encrypted by using the first key in accordance with the predetermined rule and the encrypted data is outputted. The predetermined data is extracted from the data on the basis of random numbers generated in accordance with the predetermined rule in accordance with the random number control information and the predetermined arithmetic operation is executed. The arithmetic operation resultant data as a result of the arithmetic operation is encrypted by using the second key in accordance with the predetermined rule. The encrypted arithmetic operation resultant data is inserted to the encryption output, the resultant encryption data is transmitted to the transmission path, and the data on the transmission path is received. On the basis of random numbers generated in accordance with the predetermined rule in accordance with the random number control information in a manner similar to the transmitting apparatus side, the predetermined data is extracted from the data obtained by decrypting the encryption data in the received data. The arithmetic operation resultant data obtained by executing the same arithmetic operation as the predetermined arithmetic operation of the transmitting apparatus side to the extracted predetermined data is compared with the data obtained by decrypting the encrypted arithmetic operation data inserted to the encryption data, thereby making it possible to discriminate whether or not there is a possibility that the transmitted data has been altered. Further, on the transmitting apparatus side, the predetermined data to obtain the arithmetic operation resultant data is extracted on the basis of random numbers generated in accordance with the random number control information and the obtained arithmetic operation resultant data is encrypted by using the second key and transmitted. Therefore, the arithmetic operation resultant data which is obtained on the transmitting apparatus side cannot be easily presumed. Moreover, since the output obtained by decrypting the encryption data and another output are switched in accordance with the comparison result and outputted, if it is determined that there is a possibility that the data has been altered, another data can be outputted without outputting the data obtained by decrypting the encryption data.

BRIEF DESCRIPTION OF DRAWINGS

FIG. 7 is a block diagram schematically showing a system of an example for realizing video data exploitation.

FIGS. 9A and 9B are block diagrams schematically showing a construction of an example of a data transmitting system according to the second embodiment of the invention.

FIGS. 10A and 10B are block diagrams schematically showing a construction of an example of a data transmitting system according to a modification of the second embodiment of the invention.

FIG. 11 is a block diagram schematically showing a construction of an example of a video projecting system which can be applied to the third embodiment of the invention.

FIGS. 13A and 13B are schematic diagrams schematically showing processes according to the third embodiment of the invention.

FIGS. 17A and 17B are schematic diagrams for explaining that the encrypted certification data E is inserted to the main data and the resultant data is transmitted to a transmission path.

FIGS. 18A, 18B, 18C, and 18D are timing charts showing transmitting timing of an example of the certification data E.

FIG. 19 is a schematic diagram schematically showing one field of a format of the HD-SDI.

FIG. 23 is a schematic diagram for explaining, the operation of a comparator.

FIGS. 24A, 24B, 24C, and 24D are schematic diagrams showing examples of a warning output which is outputted from an another-output generator.

FIGS. 25A and 25B are schematic diagrams showing an example in which the certification data E and the encrypted main data (video data) are transmitted by using different transmission paths.

BEST MODE FOR CARRYING OUT THE INVENTION

Figure 1:
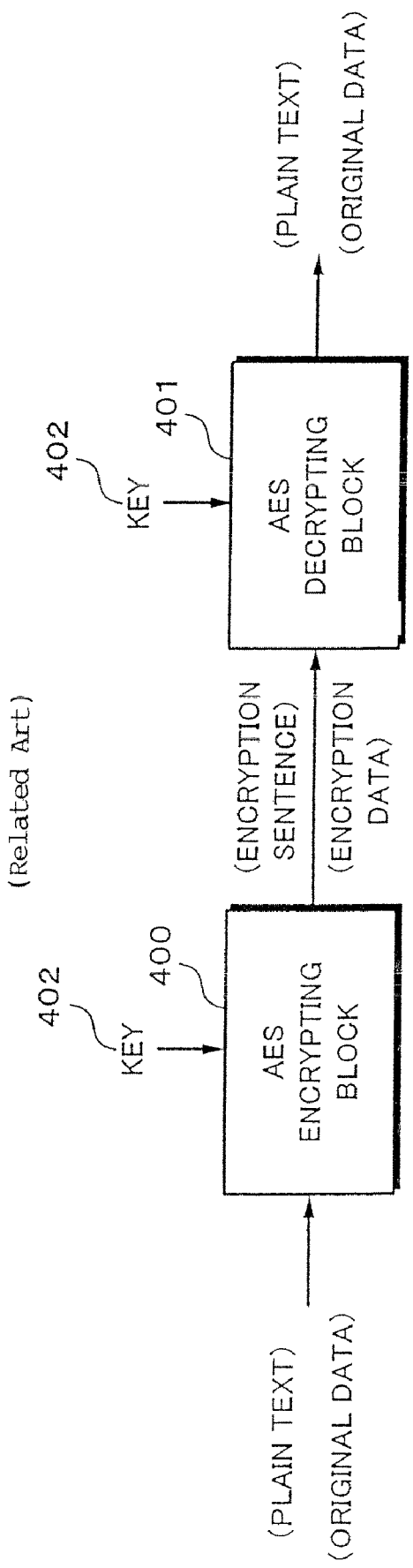
FIG. 1 is a block diagram schematically showing a construction of an example in which digital data is encrypted.
Figure 2A:
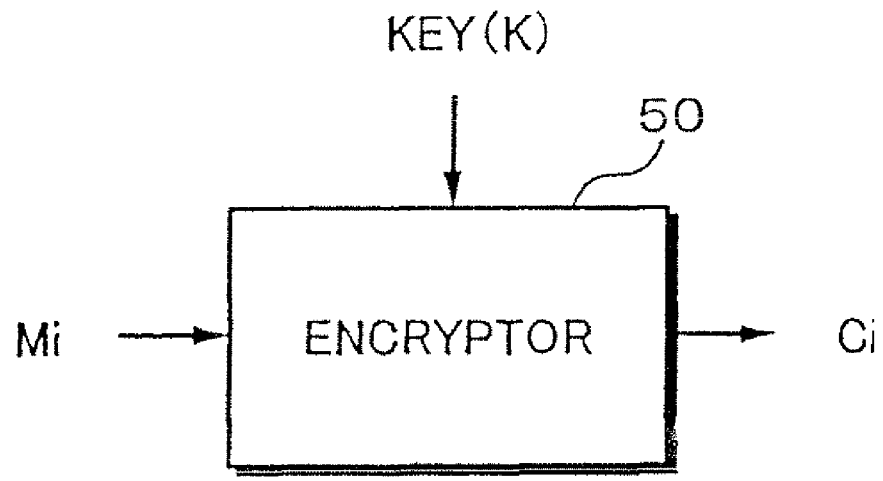
FIGS. 2A and 2B are block diagrams showing a construction of an example of an encrypting circuit according to an ECB mode.
Figure 2B:
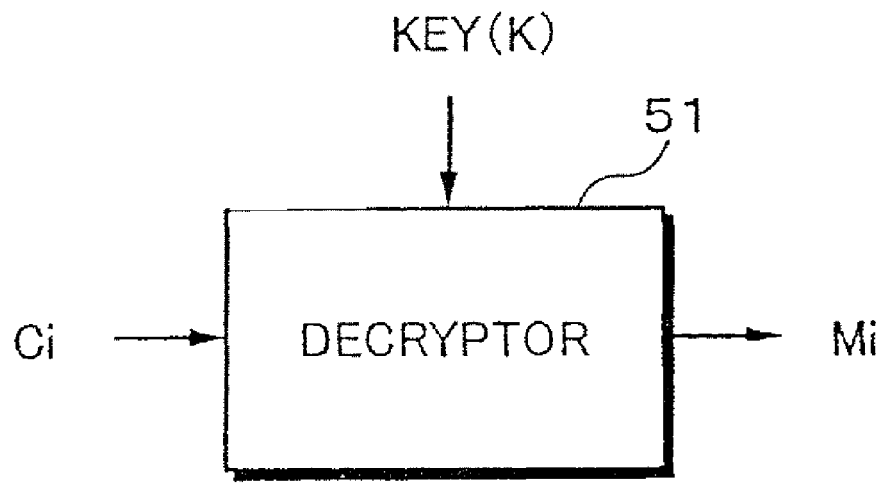
Figure 3A:
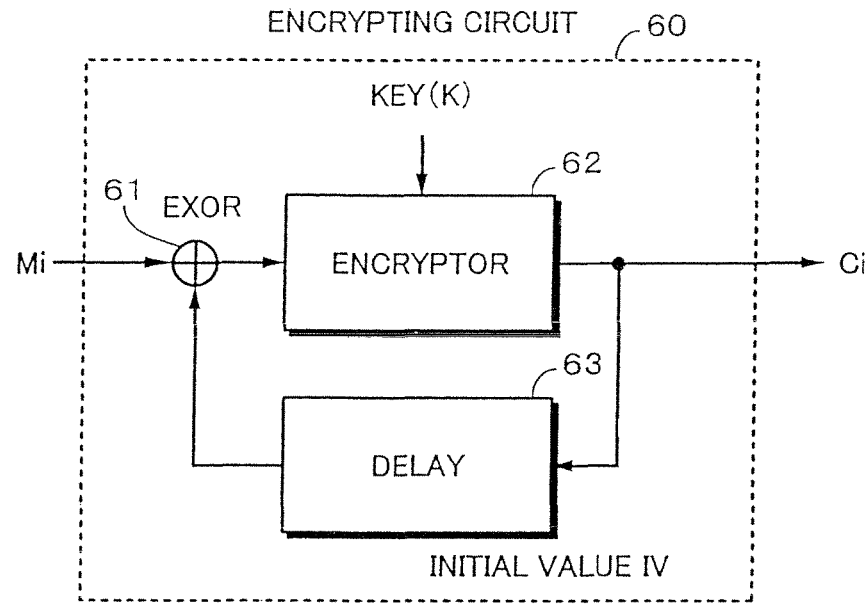
FIGS. 3A and 3B are block diagrams showing a construction of an example of an encrypting circuit according to a CBC mode.
Figure 3B:
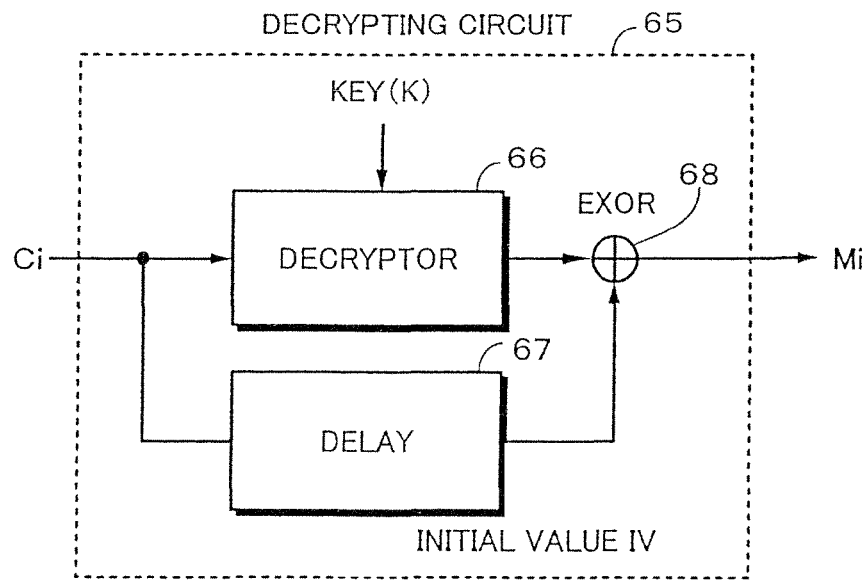
Figure 4A:
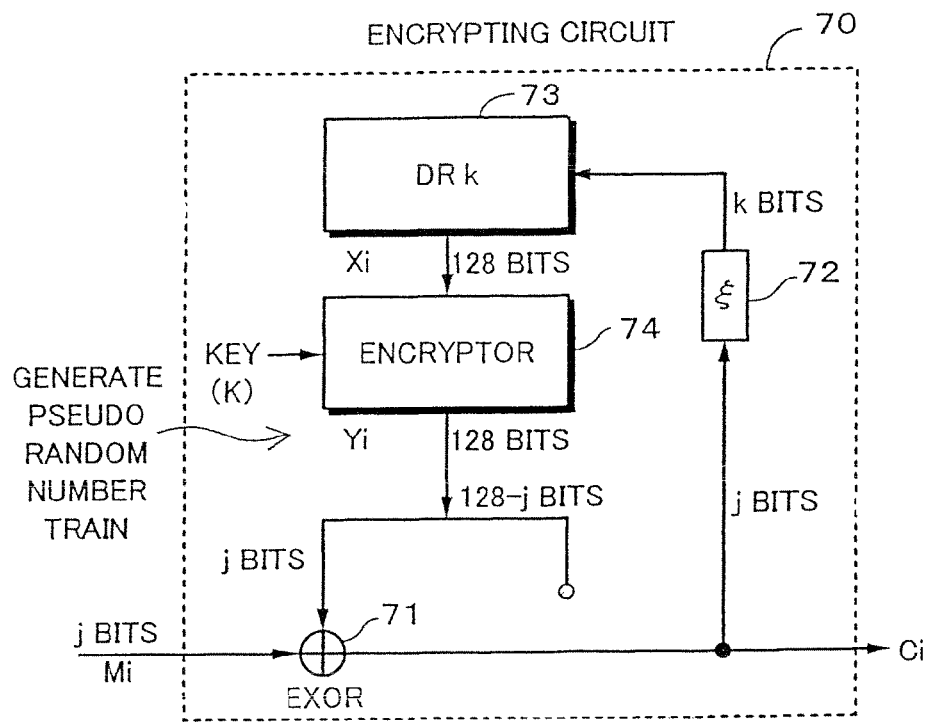
FIGS. 4A and 4B are block diagrams showing a construction of an example of an encrypting circuit according to a CFB mode.
Figure 4B:
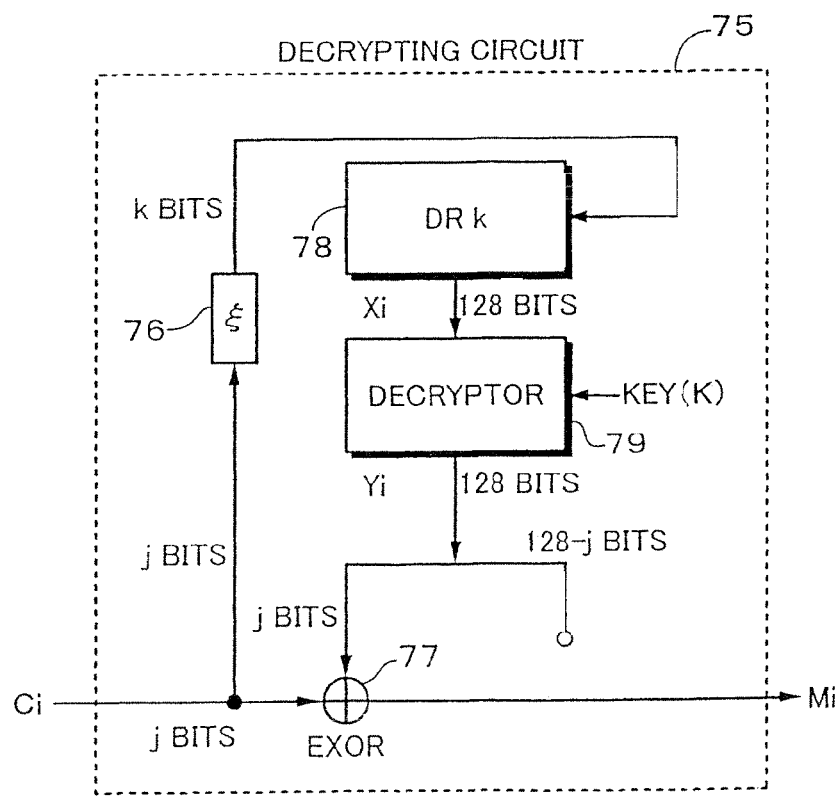
Figure 5A:
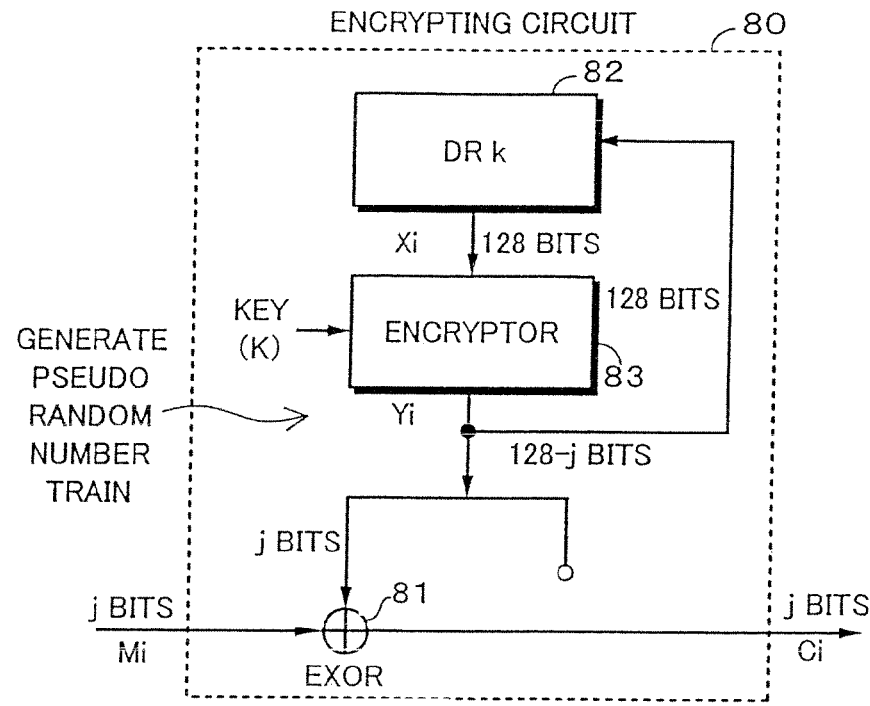
FIGS. 5A and 5B are block diagrams showing a construction of an example of an encrypting circuit according to an OFB mode.
Figure 5B:
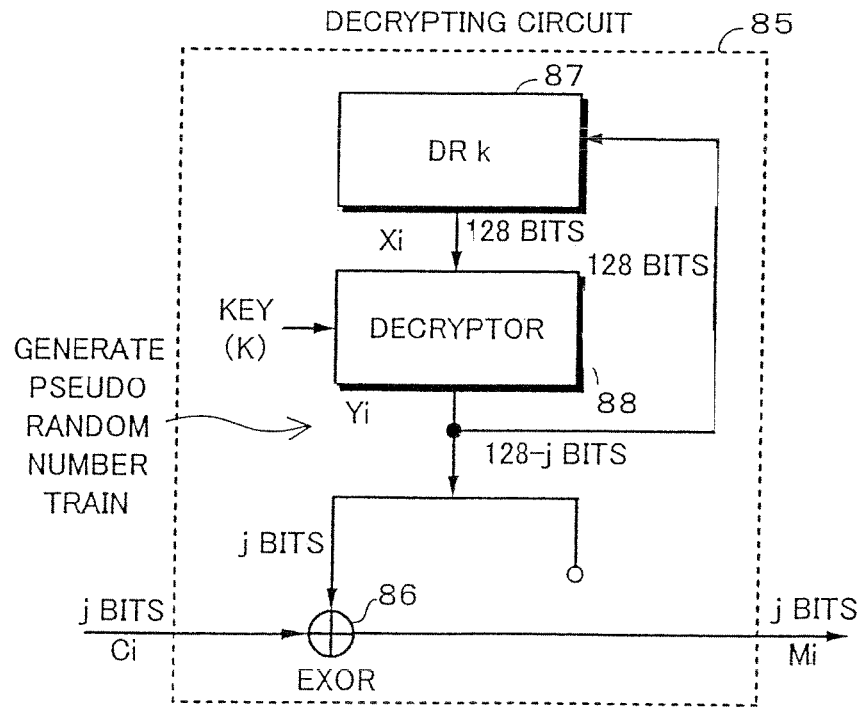
Figure 6A:
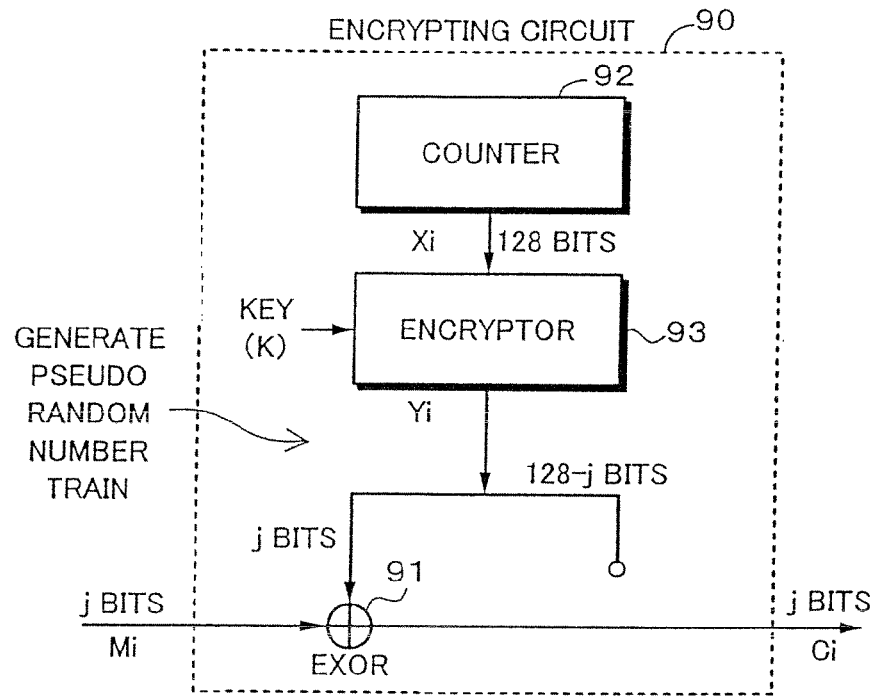
FIGS. 6A and 6B are block diagrams showing a construction of an example of an encrypting circuit according to a counter mode.
Figure 6B:
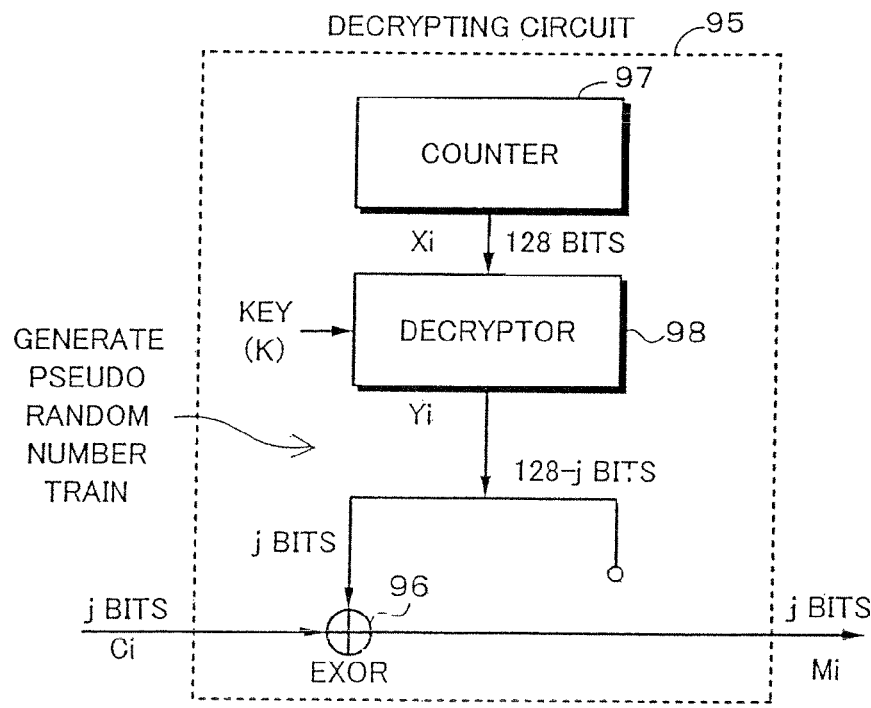

The first embodiment of the invention will be described hereinbelow. According to the invention, on a transmitting source side of digital data, certification data Ds is formed on the basis of predetermined data extracted from the data main body to be transmitted. The certification data Ds is transmitted to a transmission path together with the data main body. On a transmission destination side, the certification data Ds which has been formed on the transmitting source side and transmitted is extracted from the received data, predetermined data is extracted from the main data of the received data in a manner similar to the transmitting source side, and certification data Dr is formed. On a reception side, the received certification data Ds is compared with the certification data Dr formed by using the received main data in a manner similar to the transmitting source side. As a result of the comparison, if the certification data Ds and the certification data Dr coincide, it is possible to decide that the transmitted data is not altered. If they do no coincide, it is possible to decide that there is a possibility that the transmitted data has been altered.

Further, if it is determined that the data has been altered, by outputting data different from the transmitted data, data exploitation using the alteration of the data can be prevented.

For example, if the transmitting source is assumed to be a video server for encrypting the digital video data and transmitting the encryption data to the transmission path and the transmission destination is assumed to be a projector for receiving the encrypted digital video data transmitted through the transmission path, decrypting the encryption, reconstructing the original digital video data, and displaying an image, on the video server side, the certification data Ds is formed from a part or all of the video data and encrypted, and the certification data Ds is transmitted together with the encrypted video data.

On the projector side, the certification data Dr is formed by a method similar to that on the video server side on the basis of the video data obtained by decrypting the encryption of the received encrypted video data. On the projector side, the certification data Ds transmitted together with the encrypted video data and the certification data Dr formed on the projector side are compared, thereby detecting the alteration. As a result of the comparison, if it is decided that the certification data Ds and the certification data Dr do not coincide and the transmitted video data has been altered, the output is stopped or the video image to be outputted is changed on the projector side. Thus, the encryption decryption which is performed by altering the video data to the predetermined data as described in the prior art becomes difficult.

When the certification data Ds and the certification data Dr do not coincide, it is desirable to consider a possibility or the like of errors on the data transmission besides the possibility of the data alteration mentioned above.

Figure 8:
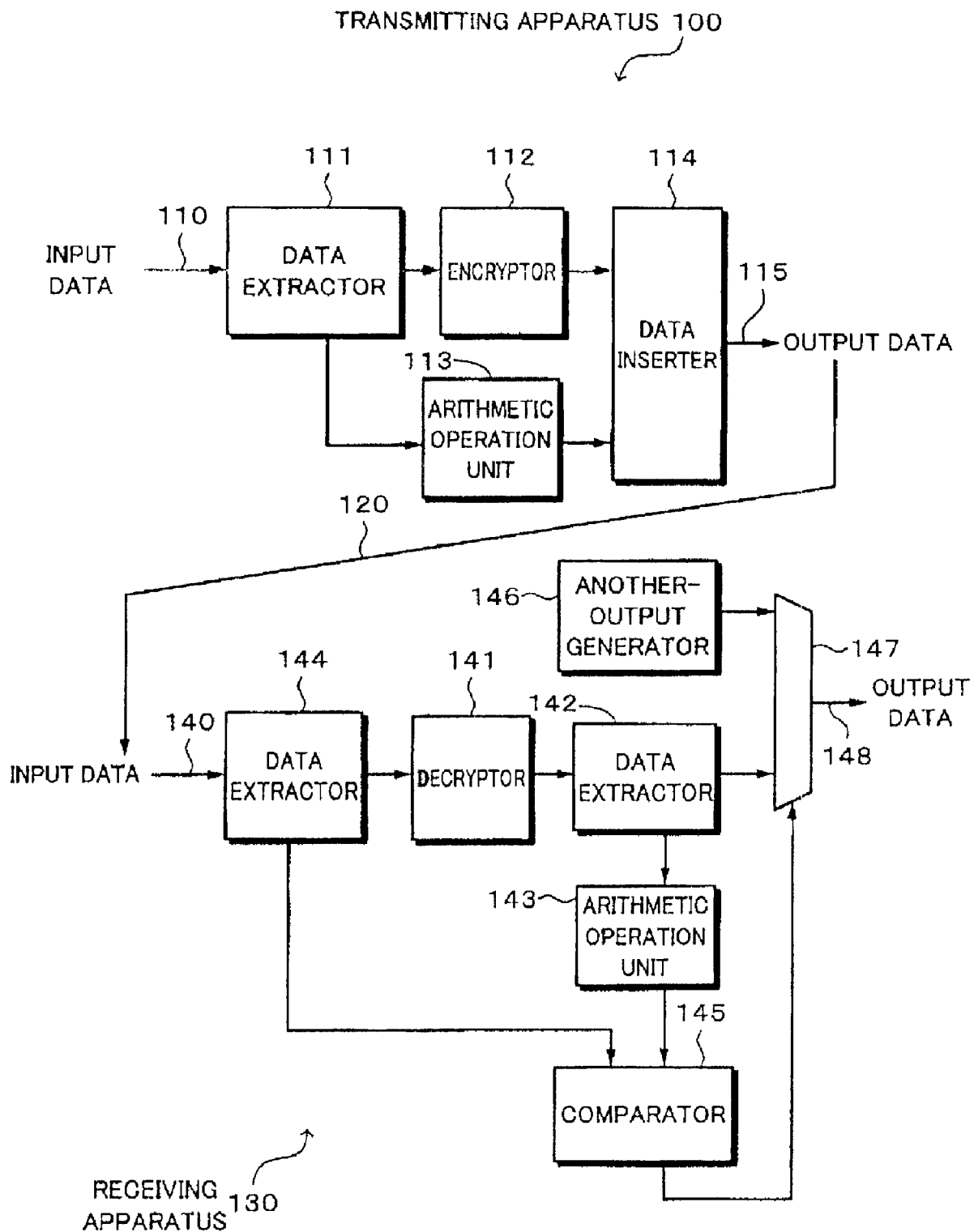
FIG. 8 is a block diagram schematically showing a construction of an example of a data transmitting system according to the first embodiment of the invention.

FIG. 8 schematically shows a construction of an example of a data transmitting system according to the first embodiment of the invention. Input data 110 inputted to a transmitting apparatus 100 is supplied to a data extractor 111. The data extractor 111 extracts a part or all of the supplied input data 110 and supplies it to an encryptor 112. The encryptor 112 executes an encrypting process to the supplied data in accordance with a predetermined rule and outputs encryption data. The encryption data is inputted to one input terminal of a data inserter 114.

The data extractor 111 extracts predetermined data from the supplied input data 110 and supplies it to an arithmetic operation unit 113. For example, data whose position in the input data 110 has preliminarily been known can be used as predetermined data. The arithmetic operation unit 113 executes a predetermined arithmetic operation to the supplied data and outputs resultant data. As an arithmetic operation by the arithmetic operation unit 113, for example, it is preferable to execute such an arithmetic operation that when the arithmetic operation is executed by using different values, a possibility that the same arithmetic operation result is outputted is extremely small and it is difficult to predict the arithmetic operation result from the input. The arithmetic operation result by the arithmetic operation unit 113 is the certification data Ds which is used to discriminate on a receiving apparatus 130 side whether or not the transmitted data has been altered.

The data inserter 114 inserts the arithmetic operation resultant data supplied from the arithmetic operation unit 113 to the encryption data supplied from the encryptor 112 and outputs the resultant data as output data 115. The output data 115 is transmitted to a transmission path 120.

The output data 115 outputted from the transmitting apparatus 100 is inputted to the receiving apparatus 130 through the transmission path 120, inputted as input data 140 to the receiving apparatus 130, and supplied to a data extractor 144. The data extractor 144 extracts the data encrypted by the encryptor 112 in the transmitting apparatus 100 from the input data 140 and supplies it to a decryptor 141. At the same time, the data extractor 144 extracts the arithmetic operation resultant data by the arithmetic operation unit 113 which has been inserted to the encryption data by the data inserter 114 in the transmitting apparatus 100 from the input data 140. The extracted data is inputted to one input terminal of a comparator 145.

The decryptor 141, decrypts the supplied data in accordance with a predetermined rule and obtains decryption data. The decryption data is inputted to one input terminal of a selector 147 through a data extractor 142. The data extractor 142 extracts data corresponding to the predetermined data inputted to the arithmetic operation unit 113 in the transmitting apparatus 100 from the decryption data. The data extracted by the data extractor 142 is supplied to an arithmetic operation unit 143. The arithmetic operation unit 143 executes the same arithmetic operation as that of the arithmetic operation unit 113 of the transmitting apparatus 100 to the supplied data. Arithmetic operation resultant data of the arithmetic operation unit 143 is the certification data Dr to discriminate whether or not the transmitted data has been altered by comparing it with the certification data Ds. The arithmetic operation resultant data of the arithmetic operation unit 143 is inputted to the other input terminal of the comparator 145.

The comparator 145 compares the arithmetic operation resultant data of the arithmetic operation unit 143 which has been inputted to one input terminal with the arithmetic operation resultant data of the arithmetic operation unit 113 in the transmitting apparatus 100 which has been extracted by the data extractor 144 and inputted to the other input terminal. The comparator 145 detects whether or not the data inputted to one input terminal and the data inputted to the other input terminal coincide, thereby making it possible to discriminate whether or not there is a possibility that the data transmitted from the transmitting apparatus 100 has been altered.

For example, if the data transmitted from the transmitting apparatus 100 has been altered, for example, on the transmission path 120, the arithmetic operation unit 143 of the receiving apparatus 130 side executes the arithmetic operation to the data different from that of the arithmetic operation unit 113 of the transmitting apparatus 100 side. Therefore, the data inputted to one input terminal of the comparator 145 and the data inputted to the other input terminal do not coincide. On the other hand, if the data is not altered, the arithmetic operation unit 143 and the arithmetic operation unit 113 execute the same arithmetic operation to the corresponding data. Therefore, the data inputted to one input terminal of the comparator 145 and the data inputted to the other input terminal coincide.

As mentioned above, the decryption data outputted from the decryptor 141 is supplied to one input terminal of the selector 147 through the data extractor 142. An output of an another-output generator 146 is inputted to the other input terminal of the selector 147. The another-output generator 146 outputs another data different from the data obtained by decrypting the encryption of the input data 140.

The selector 147 selects either one input terminal or the other input terminal in accordance with a comparison result of the comparator 145 and outputs the data inputted to the input terminal on the selected side as output data 148. That is, if it is determined in the comparator 145 that the data inputted to one input terminal and the data inputted to the other input terminal coincide and that the data transmitted through the transmission path 120 is not altered, one input terminal is selected in the selector 147 and the decryption data outputted from the decryptor 141 is outputted as output data 148 of the selector 147. On the contrary, if it is determined in the comparator 145 that the data inputted to one input terminal and the data inputted to the other input terminal do not coincide and that there is a possibility that the data transmitted through the transmission path 120 has been altered, the other input terminal is selected in the selector 147 and the other data outputted from the another-output generator 146 is outputted as output data 148 of the selector 147.

According to the first embodiment of the invention, since the data transmitting system is constructed as mentioned above, if the data transmitted from the transmitting apparatus 100 has been altered, for example, on the transmission path 120 or the like, the arithmetic operation result which has been arithmetically operated in the arithmetic operation unit 143 on the receiving apparatus 130 side on the basis of the data extracted by the data extractor 142 differs from the arithmetic operation result which has been arithmetically operated in the arithmetic operation unit 113 in the transmitting apparatus 100. Therefore, the another-output generator 146 side is selected by the selector 147 on the basis of the comparison result of the comparator 145. The data different from the input data 140 to the receiving apparatus 130 is outputted as output data 148. Consequently, the data exploitation using the alteration data can be prevented.

The second embodiment of the invention will now be described. According to the second embodiment, as compared with the data transmitting system of the first embodiment mentioned above, the data which is extracted from the input data is determined on the basis of predetermined random numbers generated. The arithmetic operation resultant data obtained by arithmetically operating the extracted data is encrypted and transmitted.

FIGS. 9A and 9B schematically shows a construction of an example of a data transmitting system according to the second embodiment of the invention. Input data 151 is inputted to a transmitting apparatus 150 and supplied to a data extractor 155. Random number control data 153 is inputted to a random number generator 156. The random number generator 156 forms random number data 157 on the basis of the inputted random number control data 153 in accordance with a predetermined rule. The random number generator 156 forms, for example, a pseudo random number train based on the supplied random number control data 153. The random number data 157 is supplied to the data extractor 155.

The data extractor 155 extracts predetermined data from the input data 151. At this time, in the data extractor 155, positions and the number of data to be extracted in the input data 151 are controlled on the basis of the supplied random number data 157. The data extracted from the input data 151 by the data extractor 155 is supplied to an arithmetic operation unit 158.

The data extractor 155 extracts a part or all of the supplied input data 151 and supplies them to an encryptor 161 as first encrypting means in Claim 25. The encryptor 161 executes encryption to the supplied data by using a key 152 as a first key in accordance with a predetermined rule and forms encryption data. The encryption data is inputted to one input terminal of a data inserter 163.

The arithmetic operation unit 158 executes a predetermined arithmetic operation to the supplied data and outputs the resultant data. Arithmetic operation resultant data 159 by the arithmetic operation unit 158 is the certification data Ds which is used to discriminate on a receiving apparatus 180 side whether or not there is a possibility that the transmitted data has been altered. As an arithmetic operation by the arithmetic operation unit 158, for example, it is preferable to execute such an arithmetic operation that when the arithmetic operation is executed by using different values, a possibility that the same arithmetic operation result is outputted is extremely small and it is difficult to predict the arithmetic operation result from the input. By further increasing the number of data to be extracted by the data extractor 155, it is possible to make the prediction of the arithmetic operation result more difficult.

The arithmetic operation resultant data 159 by the arithmetic operation unit 158 is supplied to an encryptor 160 as second encrypting means in Claim 25 and encrypted by using a key 154 as a second key in accordance with a predetermined rule. Encryption data 162 obtained by encrypting the arithmetic operation resultant data 159 by the encryptor 160 is inputted to the other input terminal of the data inserter 163.

The data inserter 163 inserts the encryption data 162 supplied from the encryptor 160 to the encryption data supplied from the encryptor 161 and outputs the resultant data as output data 164. The output data 164 is transmitted to a transmission path 170.

The output data 164 is received by the receiving apparatus 180 through the transmission path 170 and inputted to the receiving apparatus 180 as input data 181 of the receiving apparatus 180. The input data 181 is supplied to a decryptor 185 as second decrypting means in Claim 34 and also supplied to a data extractor 187. The decryptor 185 decrypts the encryption of the supplied data by using a key 182 as a fourth key. The key 182 has the same value as that of the key 152 which is used in, for example, the transmitting apparatus 150. An output of the decryptor 185 is inputted to one input terminal of a selector 195 and also supplied to a data extractor 186.

Random number control data 183 of the same value as that of the random number control data 153 which is supplied to the random number generator 156 in the transmitting apparatus 150 is inputted to a random number generator 188. The random number generator 188 forms random number data 189 based on the inputted random number control data 183. The random number generator 188 outputs, for example, a pseudo random number train based on the supplied random number control data 183 by a rule similar to that of the random number generator 156 provided for the transmitting apparatus 150 mentioned above. The random number data 189 generated by the random number generator 188 is supplied to the data extractor 186.

The data extractor 186 extracts predetermined data from the decryption data supplied from the decryptor 185. In this instance, in a manner similar to the data extractor 155 in the transmitting apparatus 150, positions and the number of data to be extracted in the decryption data are controlled on the basis of the supplied random number data 189 and the predetermined data is extracted. That is, the data which is extracted by the data extractor 186 is the data corresponding to the data extracted by the data extractor 155 in the transmitting apparatus 150. The predetermined data extracted by the data extractor 186 is supplied to an arithmetic operation unit 190.

The arithmetic operation unit 190 executes the same arithmetic operation as that of the arithmetic operation unit 158 in the transmitting apparatus 150 to the supplied data and obtains arithmetic operation resultant data 191. The arithmetic operation resultant data 191 is the certification data Dr to discriminate whether or not there is a possibility that the transmitted data has been altered by comparing it with the certification data Ds mentioned above. The arithmetic operation resultant data 191 is inputted to one input terminal of a comparator 192.

From the supplied input data 181, the data extractor 187 extracts the encryption data 162 obtained by encrypting the arithmetic operation resultant data 159 of the arithmetic operation unit 158 by the encryptor 160 by using the key 154 in the transmitting apparatus 150. The extracted data is supplied to the decryptor 193 as first decrypting means in Claim 34. The encryption is decrypted by using the key 184 as third key in accordance with a rule corresponding to the encryptor 160. The key 184 has the same value as that of, for example, the key 154 mentioned above. The data decrypted by the decryptor 193 is inputted to the other input terminal of the comparator 192.

The comparator 192 compares the arithmetic operation resultant data 191 of the arithmetic operation unit 190 inputted to one input terminal with the data which has been extracted by the data extractor 187 and decrypted by the decryptor 193 and inputted to the other input terminal, that is, with the arithmetic operation resultant data 159 of the arithmetic operation unit 158 in the transmitting apparatus 150. In the comparator 192, by detecting whether or not the data inputted to one input terminal and the data inputted to the other input terminal coincide, whether or not there is a possibility that the data transmitted from the transmitting apparatus 150 has been altered can be discriminated. That is, as already mentioned in the description of the foregoing first embodiment, if the data inputted to one input terminal of the comparator 192 and the data inputted to the other input terminal coincide, it is certified that the data is not altered on the transmission path 170.

As mentioned above, the decryption data outputted from the decryptor 185 is supplied to one input terminal of the selector 195. An output of an another-output generator 194 is inputted to the other input terminal of the selector 195. The another-output generator 194 outputs another data different from the data obtained by decrypting the encryption of the input data 181.

The selector 195 selects either one input terminal or the other input terminal in accordance with a comparison result of the comparator 192 and outputs the data inputted to the input terminal on the selected side as output data 196. That is, if it is determined that the data inputted to one input terminal and the data inputted to the other input terminal of the comparator 192 coincide and that the data transmitted through the transmission path 170 is not altered, one input terminal is selected in the selector 195 and the decryption data outputted from the decryptor 185 is outputted as output data 196 of the selector 195. On the contrary, if it is determined that the data inputted to one input terminal of the comparator and the data inputted to the other input terminal do not coincide and that there is a possibility that the data transmitted through the transmission path 170 has been altered, the other input terminal is selected in the selector 195 and the other data outputted from the another-output generator 194 is outputted as output data 196 of the selector 195.

According to the second embodiment of the invention, since it is constructed as mentioned above, if the data transmitted from the transmitting apparatus 150 is altered on the transmission path 170 or the like, the arithmetic operation result which has been arithmetically operated by the arithmetic operation unit 190 on the basis of the data extracted by the data extractor 186 on the receiving apparatus 180 side differs from the arithmetic operation result which has been arithmetically operated by the arithmetic operation unit 158 in the transmitting apparatus 150. Therefore, on the basis of the comparison result of the comparator 192, it is certified that the data has been altered on the transmission path 170. The output of the another-output generator 194 is selected as output data 196 by the selector 195. Thus, the data exploitation using the altered data can be prevented.

Further, in the second embodiment, in the transmitting apparatus 150, the input data 151 is encrypted by using the key 152, the arithmetic operation resultant data 159 by the arithmetic operation unit 158 is encrypted by using the key 154 and inserted to the data obtained by encrypting the input data 151, and the resultant data is transmitted to the transmission path 170. Therefore, the alteration of the arithmetic operation resultant data accompanied by the exploitation of the transmission data is prevented.

A modification of the second embodiment of the invention will now be described. In the second embodiment mentioned above, the key 152 which is used in the encryptor 161 to encrypt the main data and the key 154 which is used in the encryptor 160 to encrypt the arithmetic operation resultant data 159 are respectively prepared. Further, the random number control data 153 which is used in the random number generator 156 is prepared separately from the keys 152 and 154. In the modification of the second embodiment of the invention, the keys 152 and 154 and the random number control data 153 are assumed to be common data.

FIGS. 10A and 10B schematically show a construction of an example of a data transmitting system according to the modification of the second embodiment. In FIGS. 10A and 10B, portions common to those in FIGS. 9A and 9B mentioned above are designated by the same reference numerals and their detailed explanation is omitted. In a transmitting apparatus 150', a common key 200 is supplied to the random number generator 156 and the encryptors 161 and 160, respectively. The random number generator 156 generates the predetermined random number data 157 by using the common key 200 as random number control data. Each of the encryptors 161 and 160 executes an encrypting process to the supplied data by using the key 200.

Similarly, in a receiving apparatus 180', a common key 200' is supplied to the random number generator 188 and the decryptors 185 and 193, respectively. The common key 200' has the same value as that of the common key 200 used, for example, on the transmitting apparatus 150' side. The random number generator 188 generates the predetermined random number data 189 by using the key 200' as random number control data. Each of the decryptors 185 and 193 executes a decrypting process to the supplied data by using the key 200'.

In the modification of the second embodiment, in the transmitting apparatus 150', the key which is used in the random number generator 156 and the encryptors 160 and 161 is set to the common key 200. Similarly, also in the receiving apparatus 180', the key which is used in the random number generator 188 and the decryptors 185 and 193 is set to the common key 200' Therefore, the management of the keys is easier than that in the foregoing second embodiment.

The third embodiment of the invention will now be described. The third embodiment relates to an example obtained by applying the modification of the second 15, embodiment mentioned above to a video data transmitting system in which the video data is unidirectionally transmitted from a video server to a projector by a stream of the HD-SDI.

FIG. 11 schematically shows a construction of an example of the video projecting system which can be applied to the third embodiment of the invention. This video projecting system is suitable for use in the case where the video data provided as digital data is played in a movie theater or the like. A video decoder 10 decodes, for example, the compression-encoded video data supplied from a video server (not shown) through a network or the like and forms video data of a base band. The video data is converted into a format of, for example, HD-SDI and outputted as serial digital data whose transmission rate is equal to about 1.5 Gbps.

The video decoder 10 may reproduce compression-encoded video data recorded on a recording medium such as an optical disk of a large capacity, decode it, and output.

The data outputted from the video decoder 10 is supplied to an HD-SDI encrypting apparatus 12 through a coaxial cable 11. The HD-SDI encrypting apparatus 12 extracts the video data from the supplied data, encrypts it to thereby obtain encryption video data, converts the encryption video data into the format of HD-SDI again, and outputs. The key (K) upon encryption is supplied from a computer apparatus (PC) connected through an interface such as RS232C or the like. The data outputted from the HD-SDI encrypting apparatus 12 is transmitted toward a projector 16 side through a coaxial cable 13 and supplied to an HD-SDI decrypting apparatus 14.

The HD-SDI decrypting apparatus 14 extracts the encryption video data from the digital data of the HD-SDI format, decrypts the encryption, and returns the decrypted data to the video data of the original base band. As a key (K) upon decryption, the key common to the key (K) used in the HD-SDI encrypting apparatus 12 upon encryption is used. For example, it is supplied from the computer apparatus (PC) connected through the interface such as RS232C or the like.

The video data of the base band reconstructed by the HD-SDI decrypting apparatus 14 is supplied to the projector 16 through a coaxial cable 15 and an image is projected onto a screen (not shown) by the projector 16.

Although the above example has been described on the assumption that the video decoder 10 and the HD-SDI encrypting apparatus 12 are the separate apparatuses, actually, the HD-SDI encrypting apparatus 12 is built in the video decoder 10 and used. In this case, the coaxial cable 11 connecting the video decoder 10 and the HD-SDI encrypting apparatus 12 can be omitted. The video data which is outputted from the video decoder 10 can be handled as, for example, parallel digital data without being converted into the HD-SDI format. The HD-SDI decrypting apparatus 14 may be also similarly assembled in the projector 16 and used. In this case, the coaxial cable 15 can be also similarly omitted and the video data can be outputted as parallel digital data from the HD-SDI decrypting apparatus 14.

Figure 12:
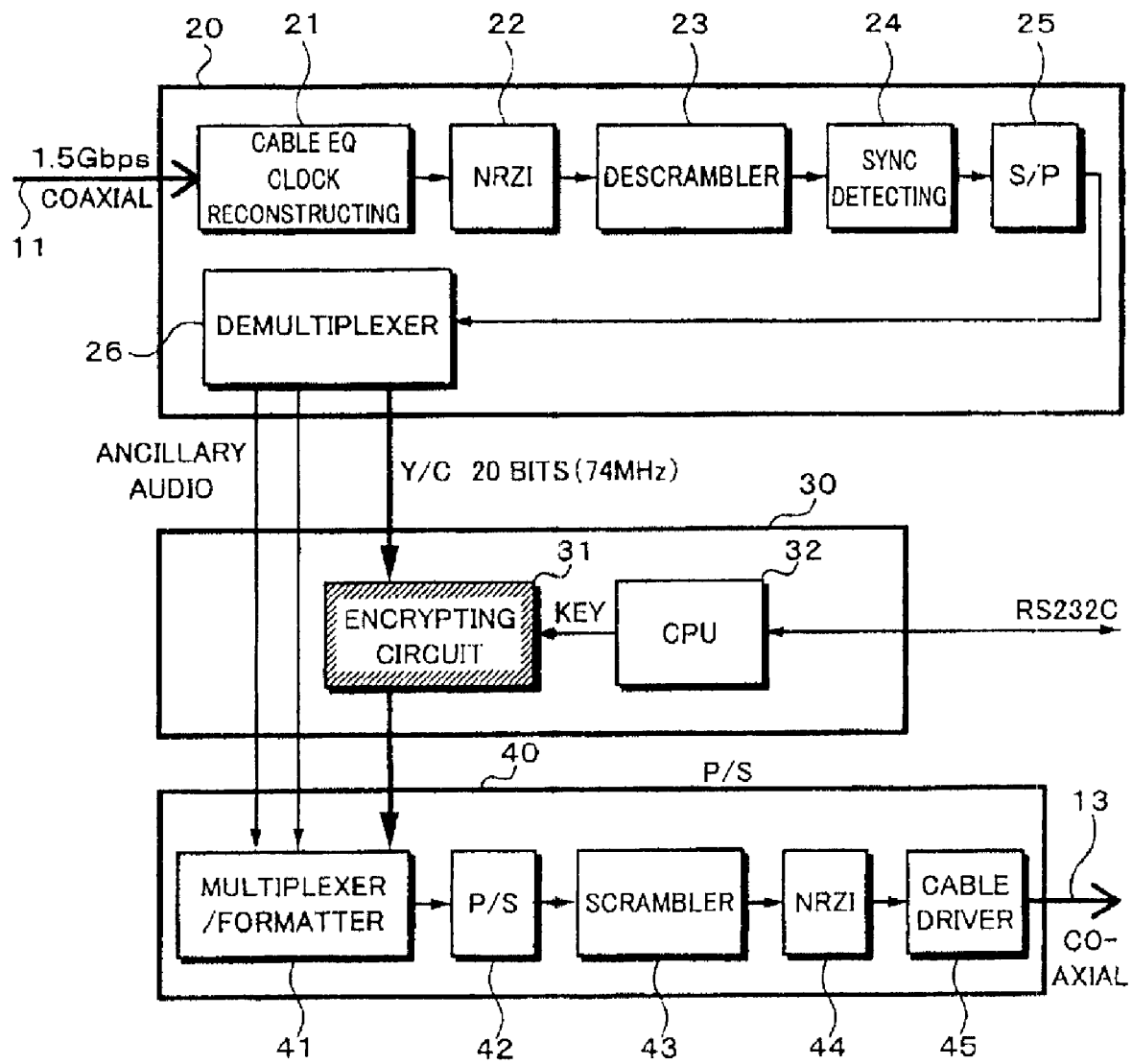
FIG. 12 is a block diagram showing a construction of an example of an HD-SDI encrypting apparatus 12.

FIG. 12 shows a construction of an example of the HD-SDI encrypting apparatus 12. Schematically speaking, the HD-SDI encrypting apparatus 12 is constructed by an HD-SDI serial/parallel converting circuit block 20, an encrypting circuit block 30, and an HD-SDI parallel/serial converting circuit block 40.

The digital data which has been converted into the HD-SDI format and transmitted through the coaxial cable 11 is supplied to the HD-SDI serial/parallel converting circuit block 20 and converted into the parallel digital data. The video data, audio data, and meta data are extracted. The audio data and the meta data are supplied to the HD-SDI parallel/serial converting circuit block 40. The video data is encrypted by the encrypting circuit block and supplied to the HD-SDI parallel/serial converting circuit block 40. In the HD-SDI parallel/serial converting circuit block 40, the audio data, the meta data, and the encrypted encryption video data are multiplexed, converted into serial digital data according to the HD-SDI format, and outputted.

In the HD-SDI serial/parallel converting circuit block 20, with respect to the inputted serial digital data of the HD-SDI format, frequency characteristics deteriorated by the coaxial cable 11 upon transmission are corrected and clocks are extracted by a cable equalizer (EQ)/clock reconstructing circuit 21. The digital data is NRZI-encoded and directivity of the signal is eliminated so that the signal can be received even if it is inverted upon reception. The digital data outputted from the cable equalizer/clock reconstructing circuit 21 is supplied to an NRZI circuit 22 and NRZI encoding performed upon transmission is decoded. As for an output of the NRZI circuit 22, a scrambling process performed to eliminate DC components upon transmission of the data is descrambled by a descrambler 23. Word synchronization is detected by a sync detecting circuit 24. The output is converted into parallel digital data by a serial/parallel converting circuit 25 on the basis of the detected word synchronization.

An output of the serial/parallel converting circuit 25 is supplied to a demultiplexer 26 and the multiplexed video data, audio data, meta data, and the like are separated. The audio data and the meta data separated by the demultiplexer 26 are supplied to a multiplexer/formatter 41 of an HD-SDI parallel/serial converting circuit block 40.

The video data separated by the demultiplexer 26 is supplied to the encrypting circuit block 30 and encrypted by an encrypting circuit 31. The encrypting circuit block has a CPU (Central Processing Unit) 32 and can communicate with an external computer apparatus through a predetermined interface such as RS-232C. The key (K) which is used upon encryption in the encrypting circuit 31 is supplied from the external computer apparatus through the predetermined interface and given to the encrypting circuit 31 through the CPU 32. The encryption video data encrypted by the encrypting circuit 31 is supplied to the multiplexer/formatter 41 of the HD-SDI parallel/serial converting circuit block 40.

In the HD-SDI parallel/serial converting circuit block 40, the multiplexer/formatter 41 multiplexes the supplied audio data, meta data, and encryption video data and maps the multiplexed data into the HD-SDI format. An output of the multiplexer/formatter 41 is converted into serial digital data by a parallel/serial converting circuit 42, scramble-processed by a scrambler 43, the DC components are eliminated, and subjected to the foregoing NRZI-encoding by an NRZI circuit 44. An output of the NRZI circuit 44 is amplified to a transmitting level by a cable driver 45 and sent to the coaxial cable 13.

The HD-SDI decrypting apparatus 14 has a circuit (assumed to be an HD-SDI serial/parallel converting circuit block 20') similar to the HD-SDI serial/parallel converting circuit block 20 in the HD-SDI encrypting apparatus 12 and a decrypting circuit block corresponding to the encrypting circuit block 30. The digital data of the HD-SDI format supplied through the coaxial cable 13 is processed in the HD-SDI serial/parallel converting circuit block 20' in a manner similar to the foregoing HD-SDI serial/parallel converting circuit block 20, so that the encryption video data, audio data, and meta data are extracted. The encryption video data is supplied to a decrypting circuit block and decrypted by using the key (K) supplied from the external computer apparatus, so that the video data of the base band is reconstructed. The video data and the meta data are supplied to the projector 16. The audio data is supplied to an audio system (not shown).

The transmitting apparatus 150' in the modification of the second embodiment mentioned above (refer to FIGS. 10A and 10B) can be made to correspond to the encrypting circuit 31 in FIG. 12. Similarly, the receiving apparatus 180' in the modification of the second embodiment can be made to correspond to the decrypting circuit in the decrypting circuit block (not shown). For convenience of explanation, the construction comprising the video decoder 10, coaxial cable 11, and HD-SDI encrypting apparatus 12 is called a video server hereinbelow. The construction comprising the HD-SDI decrypting apparatus 14, coaxial cable 15, and projector 16 is called a projector.

Figure 13B:
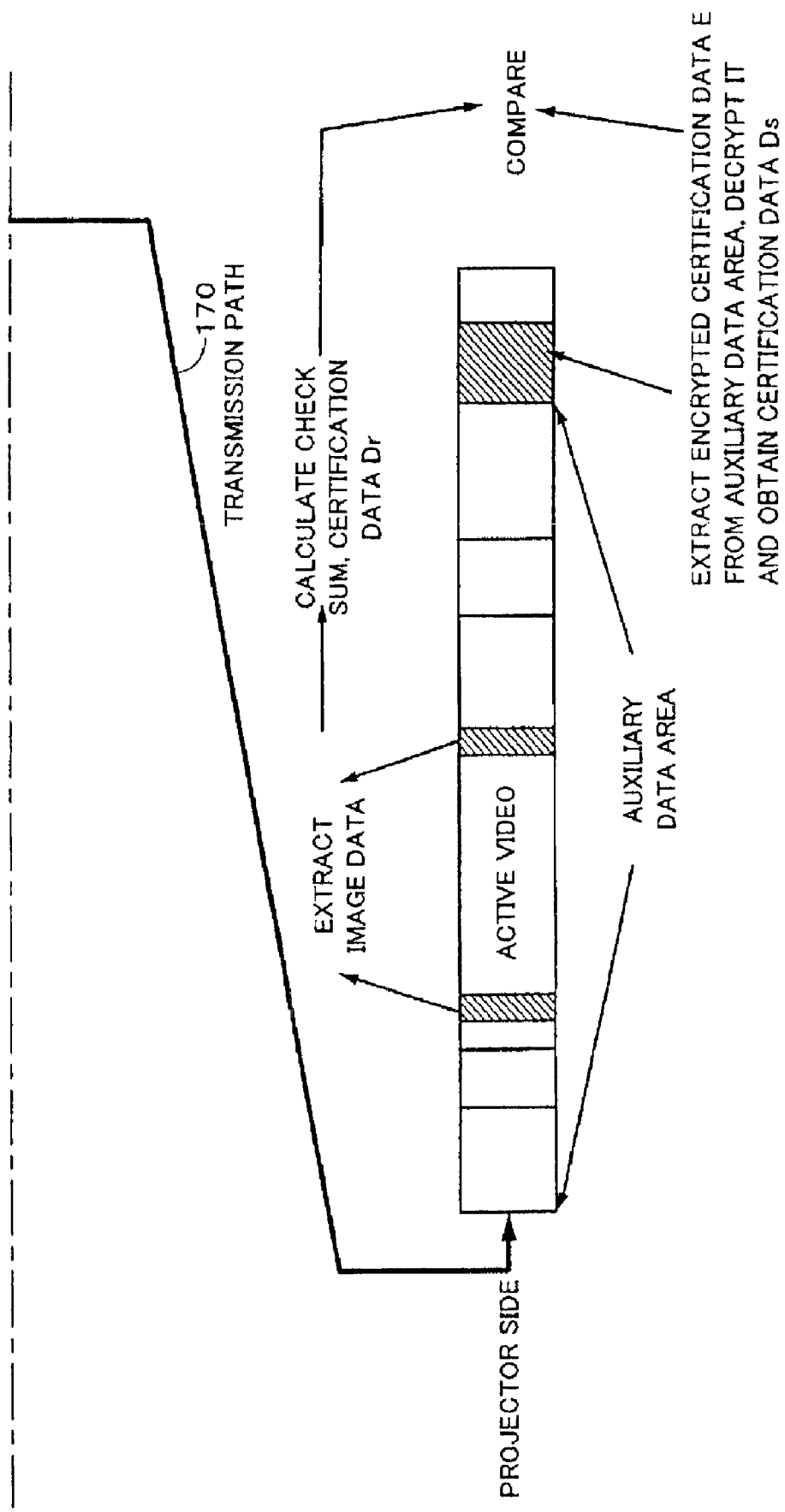
Figure 14:
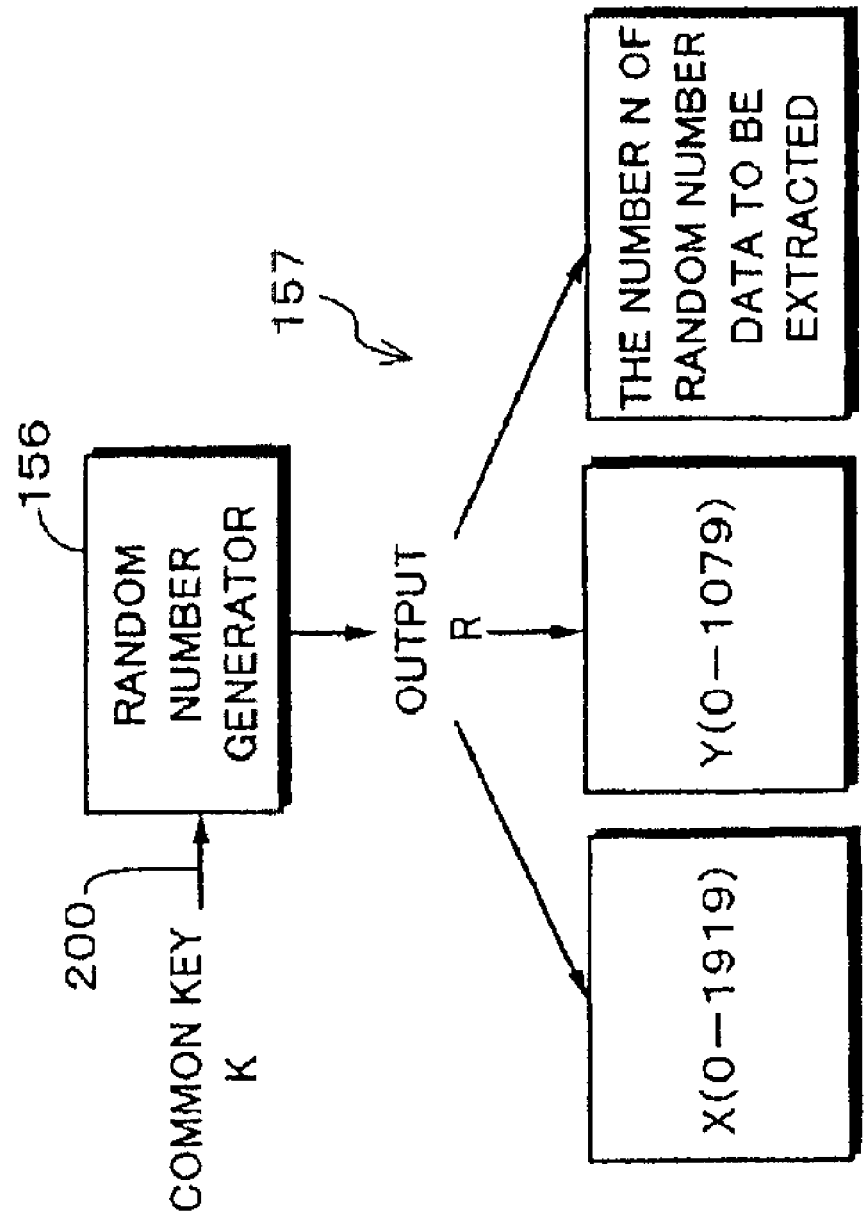
FIG. 14 is a schematic diagram for explaining the operation of a random number generator of a video server side.

FIGS. 13A and 13B schematically show processes according to the third embodiment of the invention. On the video server side, as shown in an example of FIGS. 13A and 13B, the image data is extracted from predetermined positions in an active video area in the HD-SDI format. A predetermined arithmetic operation such as a checksum arithmetic operation or the like is executed to the extracted image data, thereby obtaining the certification data Ds. The certification data Ds is encrypted by using the common key 200 by the encryptor 160 and becomes encrypted certification data E and it is inserted as meta data into, for example, an auxiliary data area of an HD-SDI stream. The HD-SDI stream to which the certification data E has been inserted is transmitted to the transmission path 170.

On the projector side, as shown in the example of FIGS. 13A and 13B, the HD-SDI stream transmitted through the transmission path 170 is received, the image data in the same positions as the positions where the data has been extracted on the video server side in the active video area is extracted, and the same arithmetic operation as that executed on the video server side is executed to the extracted data, thereby obtaining the certification data Dr. On the projector side, further, the encrypted certification data E inserted in the auxiliary data area of the HD-SDI stream on the video server side is extracted and the encryption is decrypted, thereby obtaining the certification data Ds.

The certification data Dr which has been arithmetically operated on the projector side is compared with the certification data Ds which has been arithmetically operated on the video server side, inserted to the HD-SDI stream, and transmitted to the projector side. As a result of the comparison, if the certification data Dr coincides with the certification data Ds, it is determined that no alteration is performed to the HD-SDI stream transmitted by the transmission path 170. If they do not coincide, it is determined that the alteration has been performed.

The processes of the video server side will be explained in more detail with reference to FIGS. 10A, 10B, 14, 15, 16, 17A, and 17B. In FIGS. 14 to 16, 17A, and 17B, portions common to those in FIGS. 10A and 10B are designated by the same reference numerals and their detailed explanation is omitted. As shown in an example in FIG. 14, the common key 200 is supplied to the random number generator 156. The random number generator 156 generates, for example, three random number data 157 by using the supplied key 200 as random number control data. The data extractor 155 obtains coordinates (x, y) on the active video area as a valid display area of the video data and the number (N) of data on the basis of the generated three random number data 157.

For example, when a size of active video area is equal to (1920 pixels)×(1080 lines), the coordinates (x, y) are obtained by a combination of a value x as an arbitrary value in a range of (0 to 1919) and a value y as an arbitrary value in a range of (0 to 1079). The coordinates (x, y) are set to a start point and, for example, the N pixel data shown by the number of data are extracted in the left direction. A plurality of sets of the coordinates (x, y) and the number (N) of data can be also obtained and used. In this instance, two sets of the coordinates (x, y) and the number (N) of data are obtained, that is, coordinates ($x_1$, $y_1$) and the number ($N_1$) of data and coordinates ($x_2$, $y_2$) and the number ($N_2$) of data are obtained, respectively.

In the case of using a plurality of sets of the coordinates (x, y) and the number (N) of data, the number (M) of sets may be previously obtained or dynamically determined. In the case of dynamically deciding the number (M) of sets, there is considered a method whereby four random number data 157 are generated by the random number generator 156 and, in addition to the coordinates (x, y) and the number (N) of data, the number of areas, that is, the number (M) of sets of the coordinates (x, y) and the number (N) of data is obtained.

In the case where the common key 200 is inputted to each of the random number generator 156 of the video server side and the random number generator 188 of the projector side, it is necessary that the random number data 157 and 189 to be generated are set to the same value. It is also necessary that a value of the random number data which is generated for a certain common key 200 cannot be easily predicted in the outside. When the video server side and the projector side have the same common key 200, an encryptor of the common key type such as AES can be used as a random number generator. That is, the encryptor of the AES always generates the same encryption sentence for the same input data and the same common key. If the common key is unknown, it is very difficult to know the encryption sentence which is formed by using such a common key. By using such a feature, the coordinates (x, y) and the number (N) of data which can be recognized only by the video server and the projector can be obtained.

Figure 15:
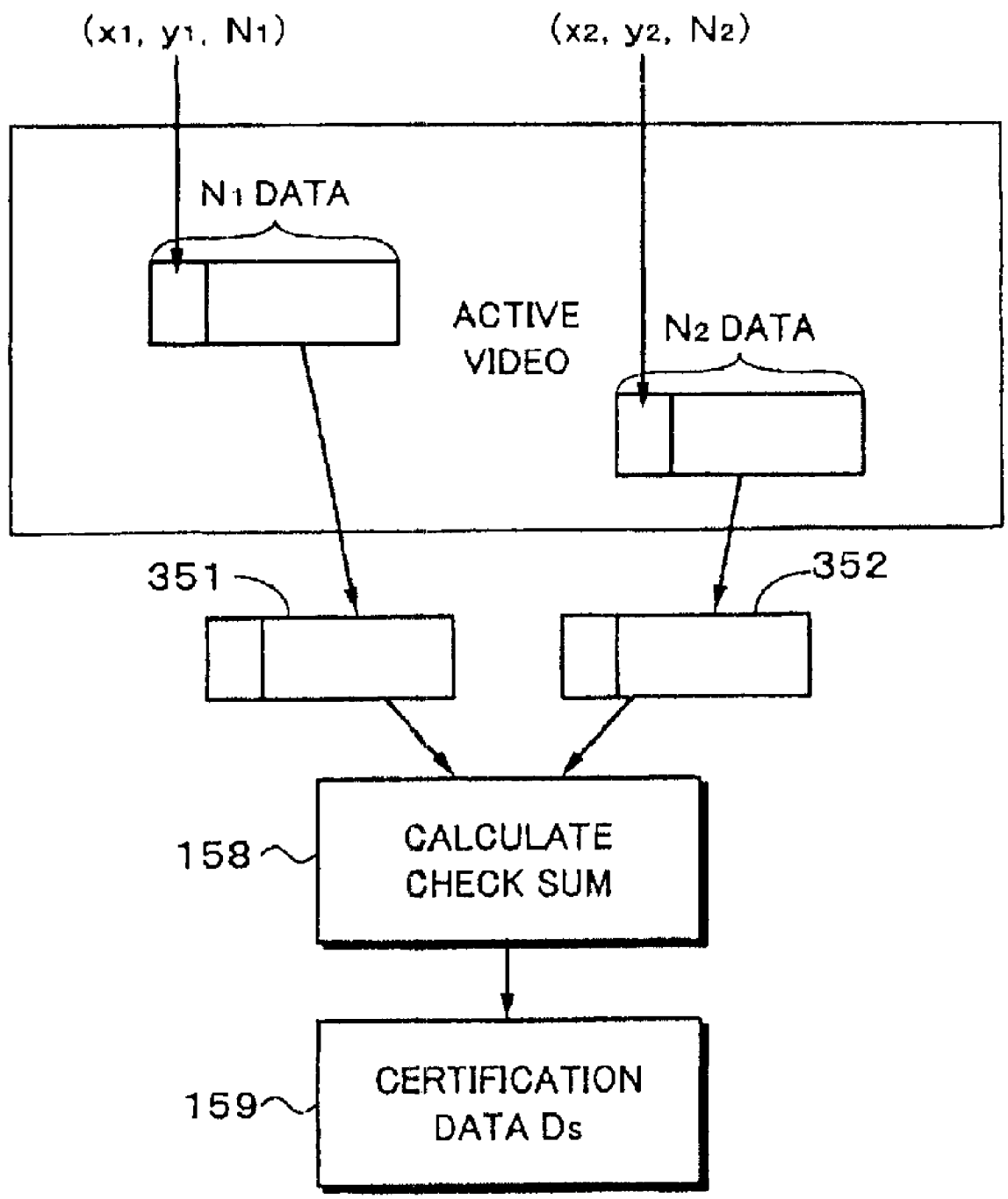
FIG. 15 is a schematic diagram for explaining the operation, to obtain certification data Ds from extracted pixel data.

As shown in an example in FIG. 15, the data extractor 155 extracts pixel data in accordance with the set of the coordinates (x, y) and the number (N) of data based on the random number data 157 generated by the random number generator 156 with respect to, for example, the active video area of the input data 151. A predetermined arithmetic operation is executed by the arithmetic operation unit 158 to the extracted pixel data, thereby obtaining the arithmetic operation resultant data 159. For example, certain coordinates $(x_1, y_1)$ on the active video area are set to a start point and $N_1$ pixel data 351 are extracted in the left direction. Similarly, coordinates $(x_2, Y_2)$ on the active video area are set to a start point and $N_2$ pixel data 352 are extracted in the left direction. The predetermined arithmetic operation is executed by the arithmetic operation unit 158 by using the pixel data 351 and 352. In this example, the predetermined arithmetic operation which is executed by the arithmetic operation unit 158 is a checksum arithmetic operation by the pixel data 351 and 352. The arithmetic operation resultant data 159 obtained by the checksum arithmetic operation is the certification data Ds to certify whether or not the data alteration has been made on the transmission path.

As a checksum arithmetic operation, for example, a method of adding the pixel data, a method of executing an XOR (Exclusive OR) arithmetic operation by using the pixel data, a method of using the pixel data as they are, or the like can be used. According to the HD-SDI, the pixel data comprises: luminance data Y whose quantization number is equal to 10 bits; and color difference data Cr/Cb whose quantization number is equal to 10 bits. The arithmetic operation to obtain the certification data can be executed to the pixel data on a 10-bit unit basis, or the arithmetic operation can be executed, for example, on a 130-bit unit basis by further using the data of pixels locating near the designated pixel. If the arithmetic operation is executed by using the data of the larger number of bits, it is more difficult to predict the certification data which is obtained as a result of the arithmetic operation. Moreover, it is also possible to obtain a digest message by a hash function (SHA-1 or the like), from a result of the checksum arithmetic operation of the pixel data and use it as certification data.

Furthermore, only the pixel data of one pixel can be used as pixel data to execute the above arithmetic operation by the arithmetic operation unit 158 or the pixel data of a plurality of frames may be used. By further increasing the number of pixel data to be used, the prediction of the certification data becomes more difficult, so that safety is enhanced. On the contrary, by increasing the number of pixel data to be used, a probability that errors of the image data occurring on the transmission path or the like exert an influence on the certification data rises. Even if the alteration of the data is not performed, there is a fear of increase in possibility that the comparison result in the comparator 192 on the projector side indicates dissidence. In the case where the data is transmitted through the transmission path in which there is no possibility of occurrence of the errors or a possibility of occurrence of the errors is extremely small, the arithmetic operation of the certification data can be executed by using all image data constructing one frame.

Figure 16:
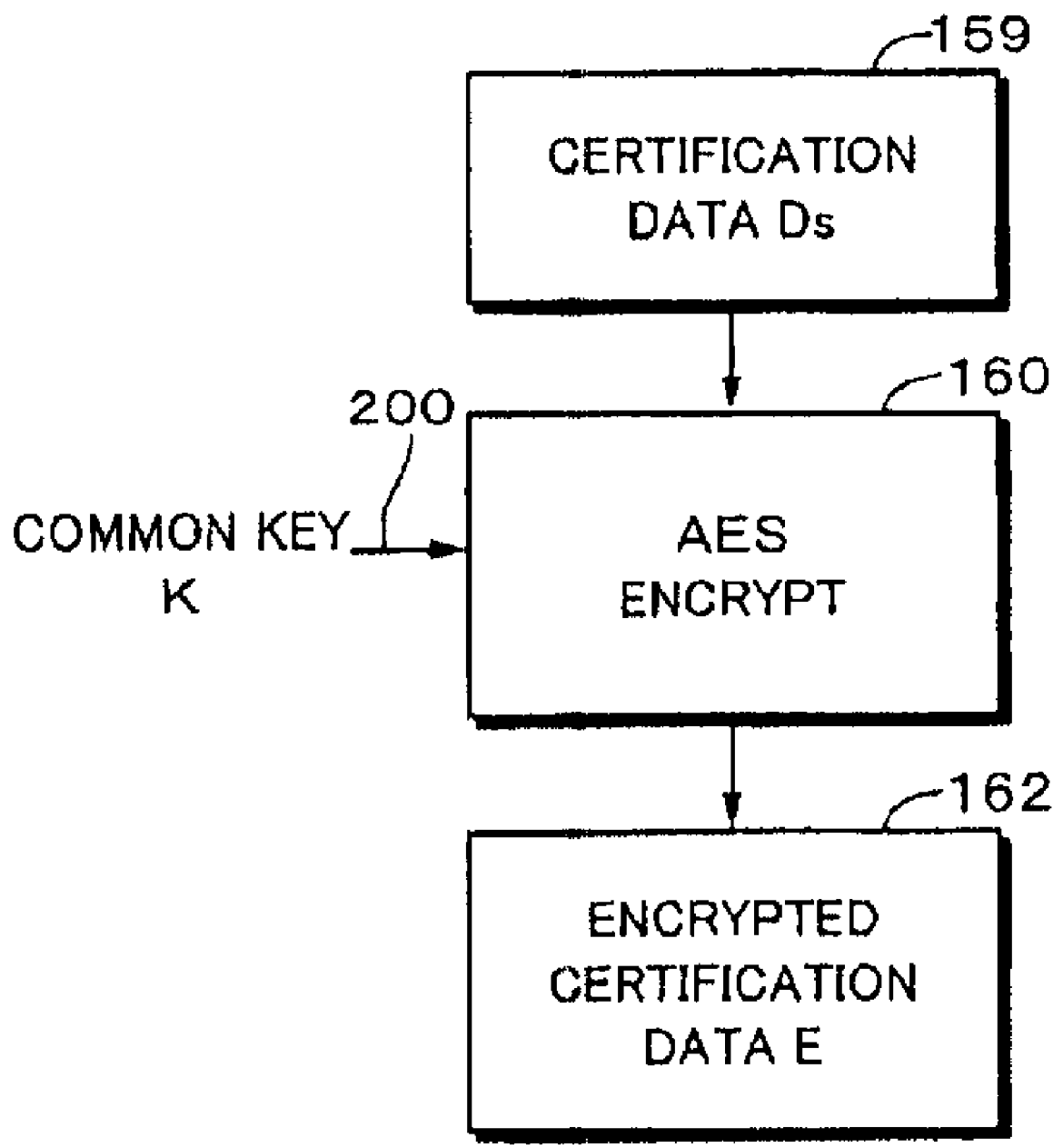
FIG. 16 is a schematic diagram for explaining the operation to obtain certification data E by encrypting the certification data Ds.
Figure 20:
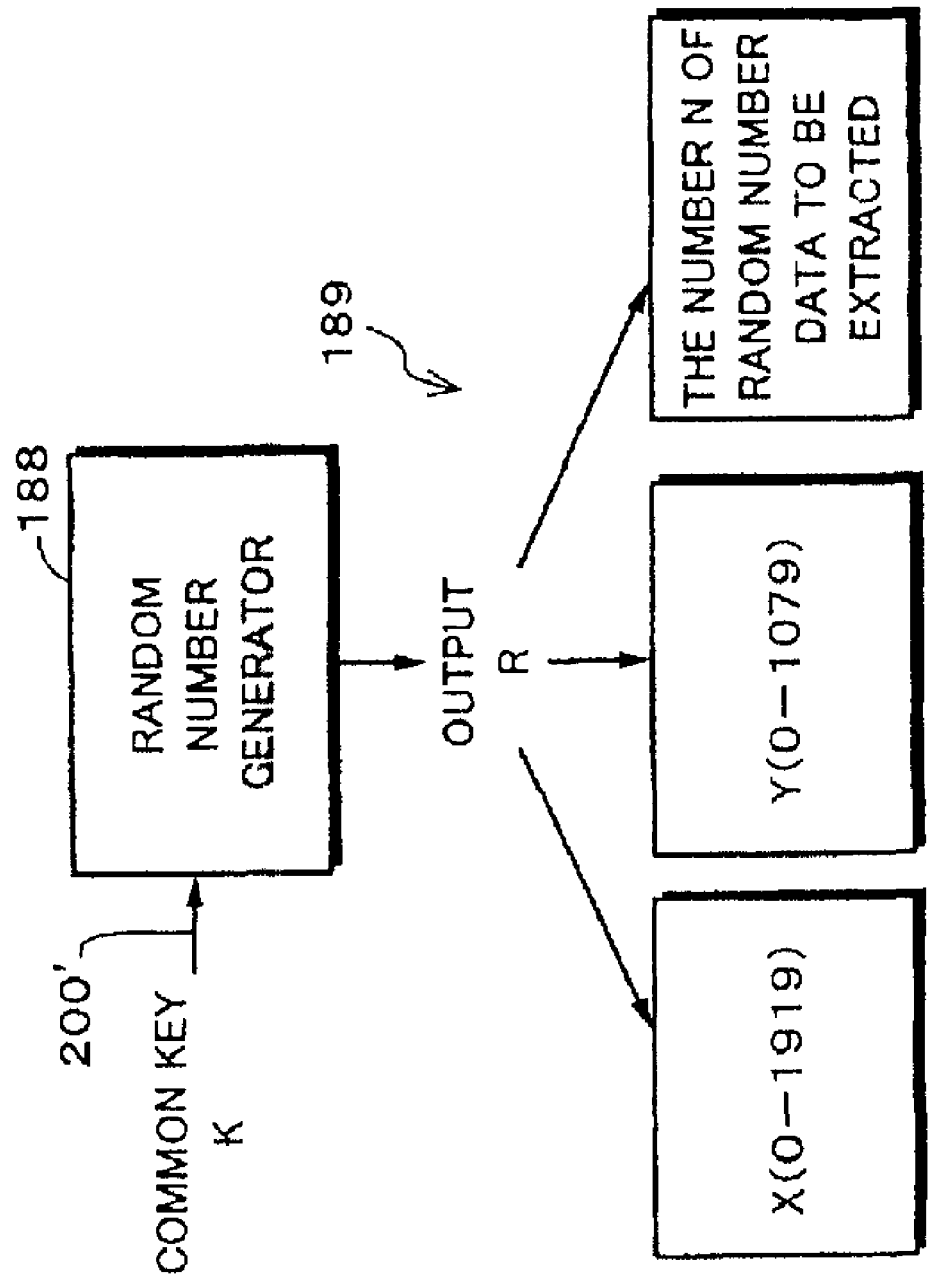
FIG. 20 is a schematic diagram for explaining the operation of a random number generator of a projector side.

The certification data Ds is supplied to the encryptor 160 from the arithmetic operation unit 158 and encrypted by using the common key 200 as shown in an example in FIG. 16. The encryption data 162 obtained by the encryption is the encrypted certification data E. For example, the AES is used as an encrypting system. The system for the encryption of the certification data Ds is not limited to the AES but another system may be used. For example, according to the system using the common key, a triple DES in which the DES is used in a triple manner and the encryption is performed can be used.

The invention is not limited to the encrypting system using the common key but an RSA (Rivest-Shamir-Adleman) encryption using a public key or an elliptic encryption can be also used. In the case of using the public key encryption, the certification data Ds is encrypted by a secret key of the video server side to thereby obtain an encryption result E1 and an encryption result E2 obtained by encrypting the encryption result E1 by a public key of the projector side is transmitted to the projector side. On the projector side, the encryption result E2 is decrypted by a secret key of the projector side to thereby obtain the encryption result E1 and the encryption result E1 is decrypted by using a public key of the video server side, thereby reconstructing the certification data Ds.

The certification data E obtained by encrypting the certification data Ds is supplied to the other input terminal of the data inserter 163 and inserted to a predetermined position of the encrypted main data outputted from the encryptor 161. The resultant data is transmitted to the transmission path 170 as shown in an example in FIG. 17A.

Although the same common key 200 has been used for the encryptor 160 and the random number generator 156 to form the encrypted certification data E in this example, the invention is not limited to such an example. That is, different keys can be used for the encryptor 160 and the random number generator 156.

FIG. 17B shows in more detail a data stream which is transmitted to the transmission path 170. The data inserter 163 can be made to correspond to the multiplexer/formatter 41 in FIG. 12. As shown in an example in FIG. 17B, the certification data E is mapped to the HD-SDI format. The certification data E is inserted as meta data for the video data into, for example, an auxiliary data area in the HD-SDI format. At this time, information showing the active video area where the certification data E has been obtained can be inserted together with the certification data E. The data of the HD-SDI format to which the certification data E has been mapped is outputted as output data 164 from the data inserter 163 and transmitted as an HD-SDI stream to the transmission path 170.

FIGS. 18A, 18B, 18C, and 18D show transmitting timing of an example of the certification data E. FIG. 18A shows a time base and time elapses to the right. It is assumed that the data is transmitted from the video server in accordance with the time base. Since the video server knows existing positions of each frame and field of the video data, as shown in the example in FIG. 18D, the certification data Ds of a plurality of frames can be preliminarily obtained by calculations. Naturally, the certification data Ds can be also obtained every frame of the data which is transmitted. As shown in the examples in FIGS. 18B and 18C, the certification data E obtained by encrypting the certification data Ds is transmitted at timing precedent to the encryption video data in which the video data has been encrypted. Although the time base is shown on a frame unit basis in FIGS. 18A, 18B, 18C, and 18D, it is shown as an example and it can be also considered as a field unit.

Explanation will be more specifically made by using the example of the HD-SDI. FIG. 19 schematically shows one field of the format of the HD-SDI. An EAV (End of Active Video) and an SAV (Start of Active Video) are arranged to the head of a horizontal line and an H-ANC (Horizontal Ancillary data) area is arranged after that. After the H-ANC area, a V-ANC (Vertical Ancillary data) area is arranged over the active video area. For example, as shown in the diagram, the certification data E is inserted to a predetermined position of at least one line before the last line of the V-ANC area. Naturally, the certification data E can be also inserted to another position of the V-ANC area or to the H-ANC area. It can be also inserted to a plurality of lines of the V-ANC area and/or the H-ANC area. Also in this case, in each frame or field, the certification data E is inserted to a position before the start position of the video data as mentioned above.

Processes of the projector side will be described with reference to FIGS. 10A, 10B, 20, 21, 22, 23, 24A, 24B, 24C, and 24D. First, as shown in an example in FIG. 20, three random number data 189 are outputted by the random number generator, 188 by using the common key 200'. The coordinates (x, y) and the number (N) of data on the active video area are obtained by the data extractor 186 on the basis of the three random number data. A plurality of sets of the coordinates (x, y) and the number (N) of data can be also obtained and used. By setting the common key 200' to the same value as that of the common key 200 of the video server side and equalizing the random number generator 188 with the random number generator 156 of the video server side, the same coordinates and number (N) of data as those obtained on the video server side can be obtained on the projector side. That is, on the projector side, the same coordinates and number (N) of data as the coordinates $(x_1, y_1)$ and number $(N_1)$ of data and the coordinates $(x_2, Y_2)$ and number $(N_2)$ of data obtained on the video server side as mentioned above are obtained.

Figure 21:
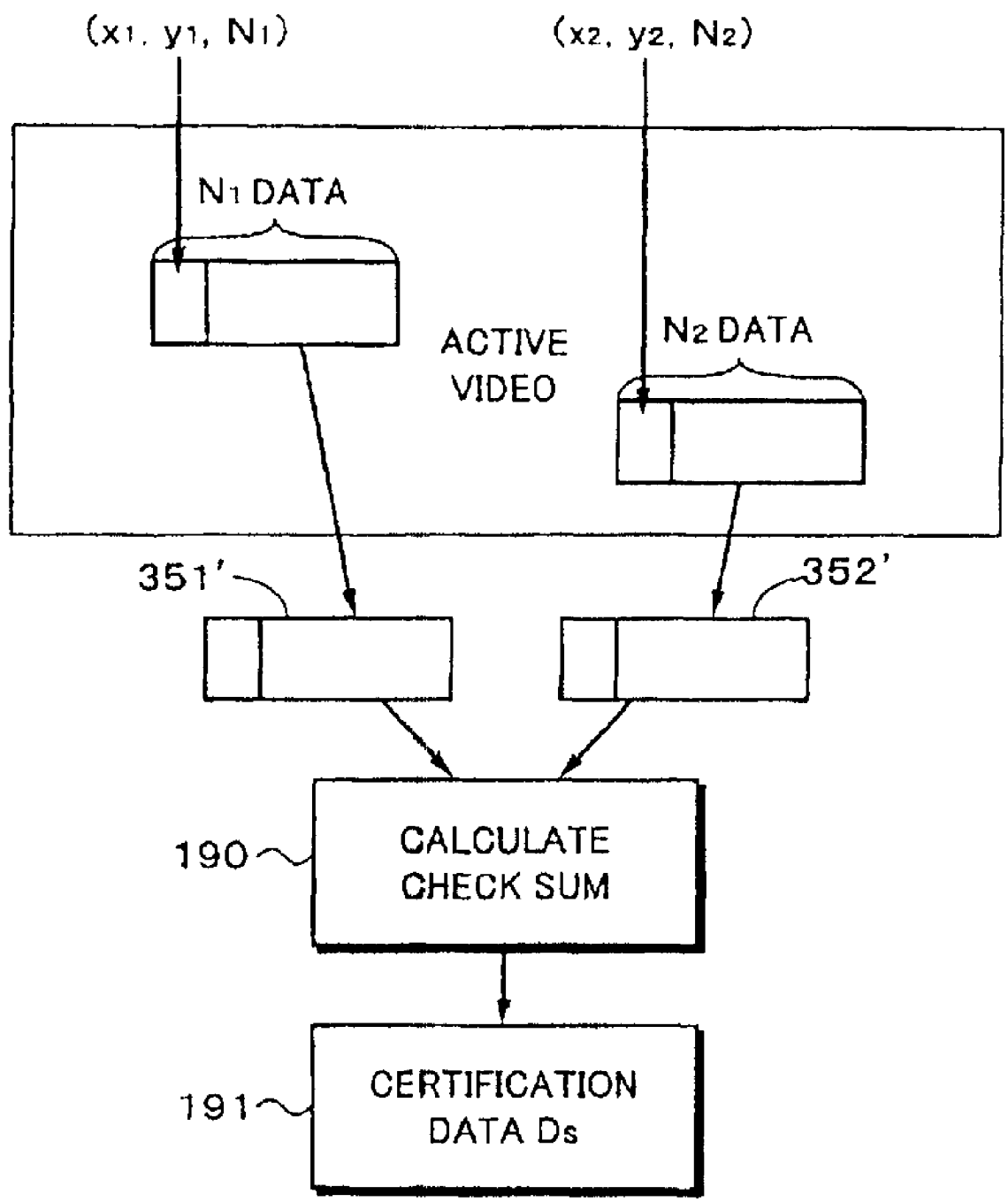
FIG. 21 is a schematic diagram for explaining the operation to obtain certification data Dr from extracted pixel data.

As shown in an example in FIG. 21, with respect to the active video area of the video data which has been transmitted through the transmission path 170 and whose encryption has been decrypted by the decryptor 185, the data extractor 186 extracts the pixel data in accordance with the coordinates $(x_1, y_1)$, the number $(N_1)$ of data, the coordinates $(x_2, Y_2)$, and the number $(N_2)$ of data mentioned above and supplies them to the arithmetic operation unit 190.

The arithmetic operation unit 190 executes the checksum arithmetic operation by using supplied pixel data 351' and 352' in a manner similar to the arithmetic operation unit 158 of the video server side, thereby obtaining the certification data Dr. The certification data Dr is inputted as arithmetic operation resultant data 191 to one input terminal of the comparator 192.

Figure 22:
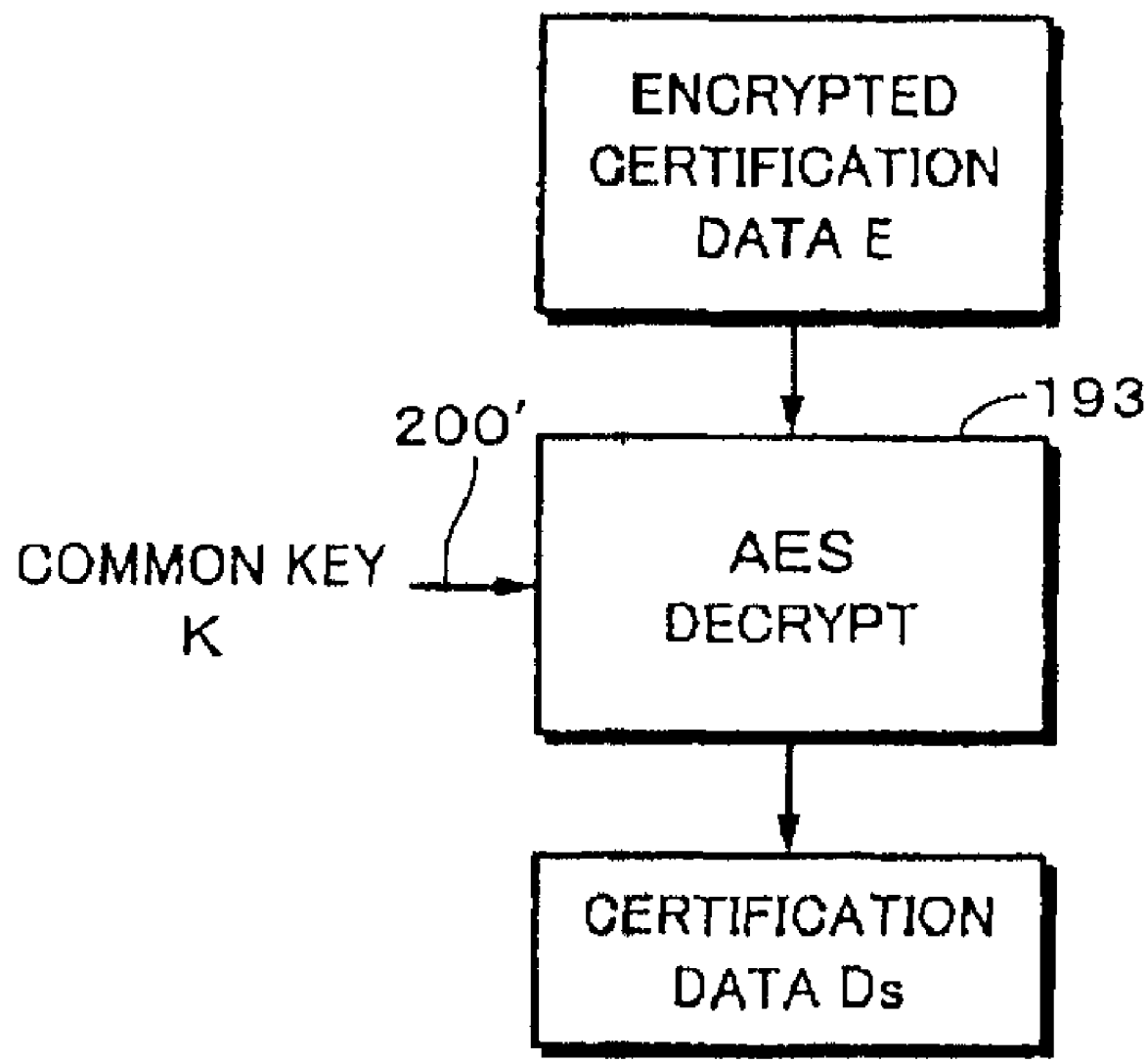
FIG. 22 is a schematic diagram for explaining the operation to decrypt the encrypted certification data E and reconstruct original certification data Ds.

As shown in an example in FIG. 22, the data extractor 187 extracts the encrypted certification data E inserted to the predetermined position of the input data 181 and supplies it to the decryptor 193. The decryptor 193 decrypts the certification data E by using the common key 200', thereby reconstructing the original certification data Ds. The certification data Ds is inputted to the other input terminal of the comparator 192.

In the comparator 192, as shown in an example in FIG. 23, the certification data Dr obtained by the checksum arithmetic operation on the projector side is compared with the certification data Ds which has been obtained by the checksum arithmetic operation on the video server side, transmitted to the projector side, and decrypted. As a result of the comparison result, if the certification data Dr and the certification data Ds coincide, it is determined that the data transmitted through the transmission path 170 is not altered, the encrypted video data is decrypted and an output of the decryptor 185 is selected by the selector 195.

If the certification data Dr and the certification data Ds do not coincide, it is determined that the data transmitted through the transmission path 170 has been altered, the encrypted video data is not decrypted, and another signal, for example, output data for warning is outputted. That is, an output of the another-output generator 194 is selected by the selector 195.

FIGS. 24A, 24B, 24C, and 24D show examples of a warning output which is outputted from the another-output generator 194. FIG. 24A shows the example of such a warning output that the whole display screen is displayed in black. The invention is not limited to such an example but the whole display screen can be displayed in another monochromatic color or a gradation display, a color chart, a test pattern, or the like may be displayed. FIG. 24B shows the example in which a random number train is used as a warning output. White noises are displayed on the whole display screen. In the example of FIG. 24B, by giving a false random number value for decryption to the data exploiter, it is possible to make the exploiter be unaware that the data alteration is being checked. FIG. 24C shows the example of such a warning output that a character train indicative of the warning is displayed on the display screen. In the example of FIG. 24C, a character train "Warning" is displayed. The invention is not limited to such an example but another character train or image showing the warning may be displayed. FIG. 24D shows the example in which no signals are outputted. Naturally, the displays of FIGS. 24A to 24D are shown here as examples and the warning output is not limited to them. Another data can be used as a warning output so long as it is the data which is not used for the encryption by the encryptor 161 on the video server side.

Although the case where the third embodiment is applied to the modification of the foregoing second embodiment has been described here, the invention is not limited to such an example. The third embodiment can be also applied to the second embodiment, for example, by making the keys which are used in the random number generator 156 and the encryptors 160 and 161 on the video server side different. In this case, the transmitting apparatus 150 (refer to FIGS. 9A and 9B) in the foregoing second embodiment can be made to correspond to the encrypting circuit 31 in FIG. 12. Similarly, the receiving apparatus 180 in the second embodiment can be made to correspond to the decrypting circuit in the decrypting circuit block (not shown).

Further, the third embodiment can be also applied to the foregoing first embodiment, for example, by omitting the encryption of the certification data and setting the pixel data which is used to form the certification data to the pixel data at the fixed position on the active video area. In this case, the transmitting apparatus 100 (refer to FIG. 8) in the foregoing first embodiment can be made to correspond to the encrypting circuit 31 in FIG. 12. Similarly, the receiving apparatus 130 in the first embodiment can be made to correspond to the decrypting circuit in the decrypting circuit block (not shown).

Although the encrypted certification, data E is inserted to the HD-SDI stream and the certification data E and the encrypted main data (video data) have been transmitted by a same transmission path 300 as shown in FIG. 25A in the above description, the invention is not limited to such an example. For example, as shown in an example in FIG. 25B, the encrypted certification data E may be transmitted by a transmission path 301 different from the transmission path 300 by which the HD-SDI stream is transmitted. Also in the case where the certification data E is transmitted by the transmission path 301, the certification data E is transmitted at the timing before the encrypted main data as described by using FIGS. 18A, 18B, 18C, and 18D.

As a transmission path 301, for example, Ethernet (registered trademark) can be used. The invention is not limited to such an example. If real-time performance can be assured for the transmission path 300, a transmission path according to another transmitting system such as wireless LAN (Local Area Network), serial interface such as RS-232C, or the like can be also used as a transmission path 301. Information showing the corresponding frame or field may be added to the encrypted certification data E.

Although the video data has been transmitted in the HD-SDI format to the projector from the video server in the above example, the invention is not limited to such an example. That is, the invention can be also applied to such a system that the video data is transmitted in another transmitting format.

Further, although the invention has been described above with respect to the example in which in the transmitting apparatus 150, the data of the active video area is extracted by the data extractor 155 and supplied to the encryptor 161, the invention is not limited to such an example. For example, by supplying all of the input data 151 to the encryptor 161 and applying an enable signal showing the active video area to the encryptor 161, it is possible to enable the encryptor 161 to encrypt only the data in the active video area shown by the enable signal. The data at the same position of the input data 151 can be replaced by the encrypted data. Also in the receiving apparatus 180, similarly, by applying the enable signal showing the active video area to the decryptor 185, it is possible to enable the decryptor 185 to decrypt only the data in the active video area shown by the enable signal. Also in this case, the data at the same position of the input data 181 can be replaced by the decrypted data.

Furthermore, although the invention has been described above on the assumption that the certification data E obtained by encrypting the certification data Ds is transmitted at the timing before the encryption video data obtained by encrypting the video data, the invention is not limited such an example. If a buffer memory to store the image data for certification is provided for the decrypting side (projector side), the position where the encrypted certification data E is inserted on the server side may be replaced by a position after the encryption video data (for example, next frame). In this case, the comparing timing of the certification data is delayed by the time corresponding to one frame.

According to the invention, in the transmitting source of the data, the certification data is formed on the basis of the predetermined data extracted from the data main body to be transmitted and transferred to the transmission destination together with the main data. On the transmission destination side, the certification data is extracted from the transmitted data, the certification data is formed from the transmitted data main body by a method similar to that of the transmitting source side, and the formed certification data is compared with the certification data extracted from the transmitted data. Therefore, there is such an effect that, on the basis of the comparison result, if both of them coincide, it is determined that there is no alteration in the transmission data, and if both of them do not coincide, it is determined that the transmission data has been altered.

According to the invention, on the basis of the comparison result between the formed certification data and the certification data extracted from the transmission data on the transmission destination side, if both of them do not coincide and it is determined that the transmission data has been altered, the false data is outputted. Therefore, the data exploitation using the data alteration can be prevented.

The invention claimed is:

1. A receiving apparatus which receives encrypted input data on a transmission path obtained by encrypting a part or all of data in accordance with a predetermined rule, outputting the encrypted data, extracting predetermined data from said data, executing a predetermined arithmetic operation to the extracted predetermined data, obtaining arithmetic operation resultant data as a result of said arithmetic operation, inserting said arithmetic operation resultant data to a predetermined position of said encryption output, and transmitting the resultant encryption data to said transmission path, comprising:
    a first data extracting device to extract first data corresponding to said arithmetic operation resultant data from the encrypted input data received through said transmission path;
    a first decrypting device to decrypt the extracted first data as transmitter certification data;
    a second decrypting device to decrypt all or part of the received encrypted input data on the basis of a predetermined rule device and to output decrypted input data;
    a second data extracting device to extract second data from the predetermined position of the outputted decrypted input data;
    an arithmetic operating device to execute the same arithmetic operation as said arithmetic operation to the data which corresponds to said predetermined data on the second data and output receiver certification data;
    a comparing device to compare the transmitter certification data with the receiver certification data; and
    a switching device to switch the output of the receiver apparatus between the decrypted input data and the output of another output generator in accordance with a comparison result of said comparing device.

2. A receiving apparatus according to claim 1, wherein on the basis of the comparison result of said comparing device, if the data extracted by said first data extracting device and the arithmetic operation resultant data by said arithmetic operating device coincide, it is determined that said received data is not altered, and if they do not coincide, it is determined that there is a possibility that said received data has been altered.

3. A receiving apparatus according to claim 2, wherein on the basis of the comparison result of said comparing device, if it is determined that said received data is not altered, said switching device selects the output of said decrypting device, and if it is determined that there is a possibility that said received data has been altered, said switching device selects said another output.

4. A receiving apparatus according to claim 1, wherein said received data is video data.

5. A receiving apparatus according to claim 4, wherein said second data extracting device extracts pixel data at one or a plurality of predetermined positions as said predetermined data.

6. A receiving apparatus according to claim 4, wherein said received data has been transmitted in a format according to regulations of an a High Definition-Serial Data Interface (HD-SDI).

7. A receiving apparatus according to claim 6, wherein the data corresponding to said arithmetic operation resultant data has been inserted into an auxiliary data area according to said HD-SDI format and transmitted.

8. A receiving method which receives encrypted input data on a transmission path obtained by encrypting a part or all of data in accordance with a predetermined rule, outputting the encrypted data, extracting predetermined data from said data, executing a predetermined arithmetic operation to the extracted predetermined data, obtaining arithmetic operation resultant data as a result of said arithmetic operation, inserting said arithmetic operation resultant data to a predetermined position of said encryption output, and transmitting the resultant encryption data to said transmission path, comprising:

a first data extracting step of extracting first data by a first data extracting device corresponding to said arithmetic operation resultant data from the encrypted input data received through said transmission path;

decrypting by a first decrypting; device the extracted first data as transmitter certification data;

decrypting by a second decrypting device to decrypt all or part of the received encrypted input data on the basis of a predetermined rule and to output decrypted input data;

a second data extracting step of extracting by a second data extracting device second data from the predetermined position of the outputted decrypted input data;

executing the same arithmetic operation by an arithmetic operation unit as said arithmetic operation to the data which corresponds to said predetermined data on the second data and output receiver certification data;

comparing the transmitter certification data with the receiver certification data; and switching the output of the receiving method between the decrypted input data and the output of another output generator in accordance with a comparison result in said comparing step.

9. A receiving apparatus which receives encrypted input data on a transmission path obtained by encrypting a part or all of data by using a first key in accordance with a predetermined rule, outputting the encrypted data, extracting predetermined data from said data on the basis of random numbers generated in accordance with a predetermined rule in accordance with random number control information, executing a predetermined arithmetic operation to the extracted predetermined data, encrypting arithmetic operation resultant data as a result of said arithmetic operation by using a second key in accordance with a predetermined rule, inserting the encrypted arithmetic operation resultant data to a predetermined position of said encryption output, and transmitting the resultant encryption data to said transmission path, comprising:

a first data extracting device to extract first data corresponding to said arithmetic operation resultant data from the encrypted input data received through said transmission path;

a first decrypting device to decrypt said encrypted arithmetic operation resultant data extracted by said first data extracting device by using a third key in accordance with a predetermined rule;

a second decrypting device to decrypt all or part of the encryption formed by using said first key of said received encrypted input data by using a fourth key in accordance with a predetermined rule and to output decrypted input data;

a second data extracting device to extract second data from the predetermined position of the outputted decrypted input data on the basis of the random numbers generated in accordance with the predetermined rule in accordance with the random number control information;

an arithmetic operating device to execute the same arithmetic operation as said arithmetic operation to the data which corresponds to said predetermined data on the second data and output receiver certification data;

a comparing device to compare the transmitter certification data with the receiver certification data; and a switching device to switch the output of the receiver apparatus between the decrypted input data and the output of another output generator in accordance with a comparison result of said comparing device.

10. A receiving apparatus according to claim 9, wherein on the basis of the comparison result of said comparing device, if said arithmetic operation resultant data decrypted by said first decrypting device and said arithmetic operation resultant data by said arithmetic operating device coincide, it is determined that said received data is not altered, and if they do not coincide, it is determined that there is a possibility that said received data has been altered.

11. A receiving apparatus according to claim 10, wherein on the basis of the comparison result of said comparing device, if it is determined that said received data is not altered, said switching device selects the output of said decrypting device, and if it is determined that there is a possibility that said received data has been altered, said switching device selects said another output.

12. A receiving apparatus according to claim 9, wherein said received data is video data.

13. A receiving apparatus according to claim 12, wherein said second data extracting device extracts pixel data at one or a plurality of predetermined positions as said predetermined data.

14. A receiving apparatus according to claim 12, wherein said received data has been transmitted in a format according to regulations of a High Definition-Serial Data Interface (HD-SDI).

15. A receiving apparatus according to claim 14, wherein the data corresponding to said arithmetic operation resultant data has been inserted into an auxiliary data area according to said HD-SDI format and transmitted.

16. A receiving apparatus according to claim 9, wherein said third and fourth keys have a same value.

17. A receiving apparatus according to claim 16, wherein said random number control information and said third and fourth keys have a same value.

18. A receiving apparatus according to claim 16, wherein said first and second keys have a same value and said third and fourth keys have the same value as that of said first and second keys.

19. A receiving method which receives encrypted input data on a transmission path obtained by encrypting a part or all of data by using a first key in accordance with a predetermined rule, outputting the encrypted data, extracting predetermined data from said data on the basis of random numbers generated in accordance with a predetermined rule in accordance with random number control information, executing a predetermined arithmetic operation to the extracted predetermined data, encrypting arithmetic operation resultant data as a result of said arithmetic operation by using a second key in accordance with a predetermined rule, inserting the encrypted arithmetic operation resultant data to a predetermined position of said encryption output, and transmitting the resultant encryption data to said transmission path, comprising:

a first data extracting step of extracting data by a first data extracting device corresponding to said encrypted arithmetic operation resultant data from the encrypted input data received through said transmission path;

a first decrypting step of decrypting by a first decrypting device said encrypted arithmetic operation resultant data extracted in said first data extracting step by using a third key in accordance with a predetermined rule;

a second decrypting step of decrypting by a second decrypting device a part or all of the encryption formed by using said first key of said received encrypted input data by using a fourth key in accordance with a predetermined rule and outputting the decrypted input data;

a second data extracting step of extracting data by a second data extracting device second data from the predetermined position of the outputted decrypted input on the basis of the random numbers generated in accordance with the predetermined rule in accordance with the random number control information;

executing the same arithmetic operation by an arithmetic operation unit as said arithmetic operation to the data which corresponds to said predetermined data on the second data and outputting receiver certification data;

comparing the transmitter certification data with the receiver certification data; and switching the output of the receiving method between the decrypted input data and the output of another output generator in accordance with a comparison result in said comparing step.

* * * * *